United States Patent [19]
Fay

[11] 3,988,875
[45] Nov. 2, 1976

[54] APPARATUS FOR PRODUCING AND PACKAGING FOOD CHIPS

[75] Inventor: Rudolph J. Fay, Cincinnati, Ohio

[73] Assignee: J. W. Fay & Son, Inc., Cincinnati, Ohio

[22] Filed: Nov. 5, 1975

[21] Appl. No.: 628,895

[52] U.S. Cl. .................................. 53/123; 53/159; 99/356; 53/212
[51] Int. Cl.² .................................. B65B 35/30
[58] Field of Search ............ 99/355, 352, 356, 404, 99/407; 426/106, 108, 124, 392, 410–411; 53/159–160, 147, 188, 195, 212, 123

[56] References Cited
UNITED STATES PATENTS

| | | | |
|---|---|---|---|
| 2,489,726 | 11/1949 | Salerno | 426/128 X |
| 2,947,266 | 8/1960 | Farrer | 99/356 X |
| 3,520,248 | 7/1970 | Mackendrick | 99/355 X |
| 3,585,923 | 6/1971 | Waller | 99/356 |
| 3,609,939 | 10/1971 | Hooper et al. | 53/159 |
| 3,690,247 | 9/1972 | VanCleven et al. | 99/407 X |
| 3,889,445 | 6/1975 | Brash | 53/159 X |
| 3,903,674 | 9/1975 | Brush et al. | 53/188 |

*Primary Examiner*—Edward L. Roberts
*Assistant Examiner*—Arthur O. Henderson
*Attorney, Agent, or Firm*—Wood, Herron & Evans

[57] ABSTRACT

Apparatus for use in the automatic stacking and packaging of potato chips made by mixing potato chip flakes and water to create a dough, which dough is then rolled into a sheet and cut into dough chips. After frying, the dough chips are all of substantially the same size and shape such that the apparatus of the application may automatically stack those chips into stacks of identical quantities and wrap those stacks within individual flexible, impermeable wrappers.

47 Claims, 17 Drawing Figures

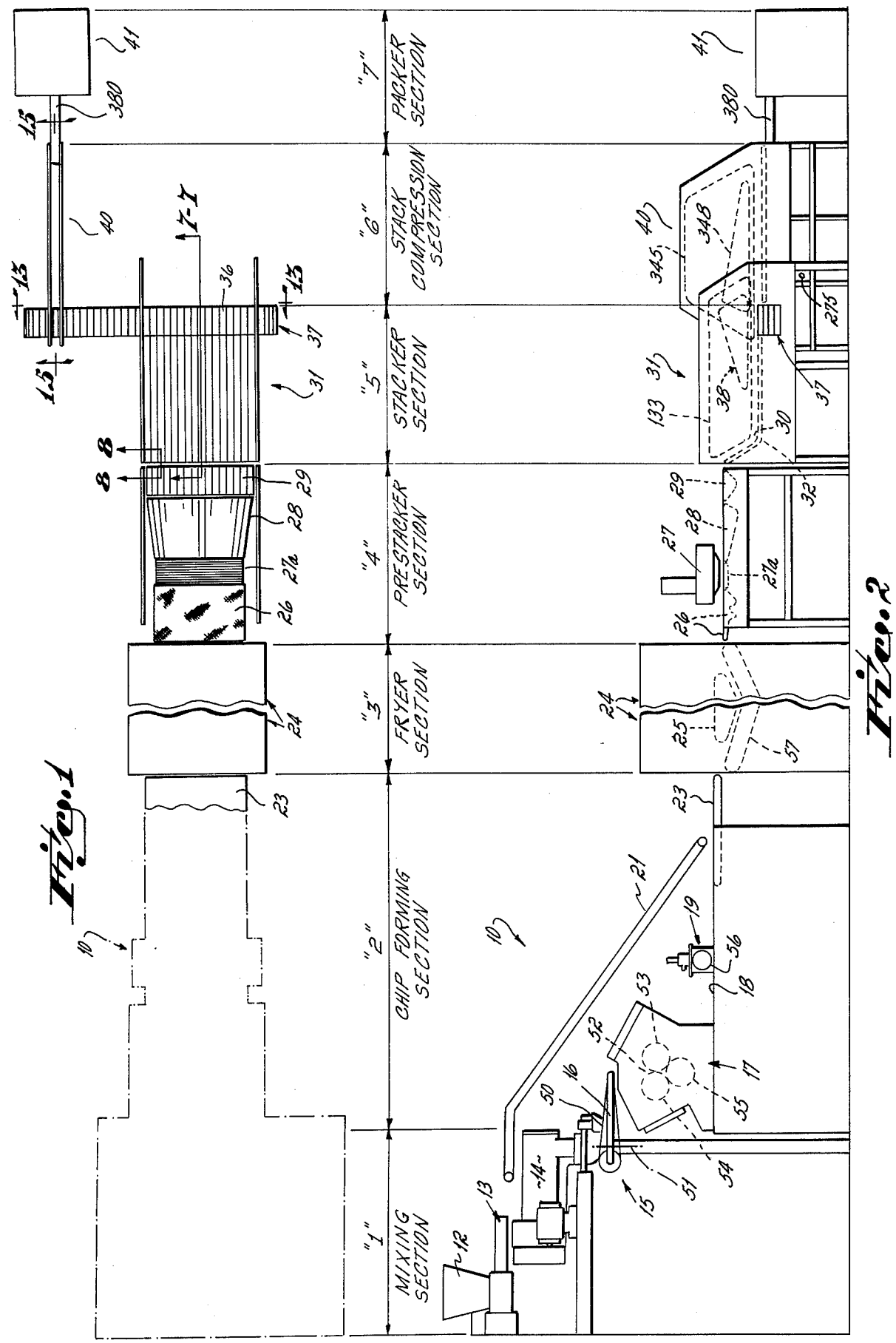

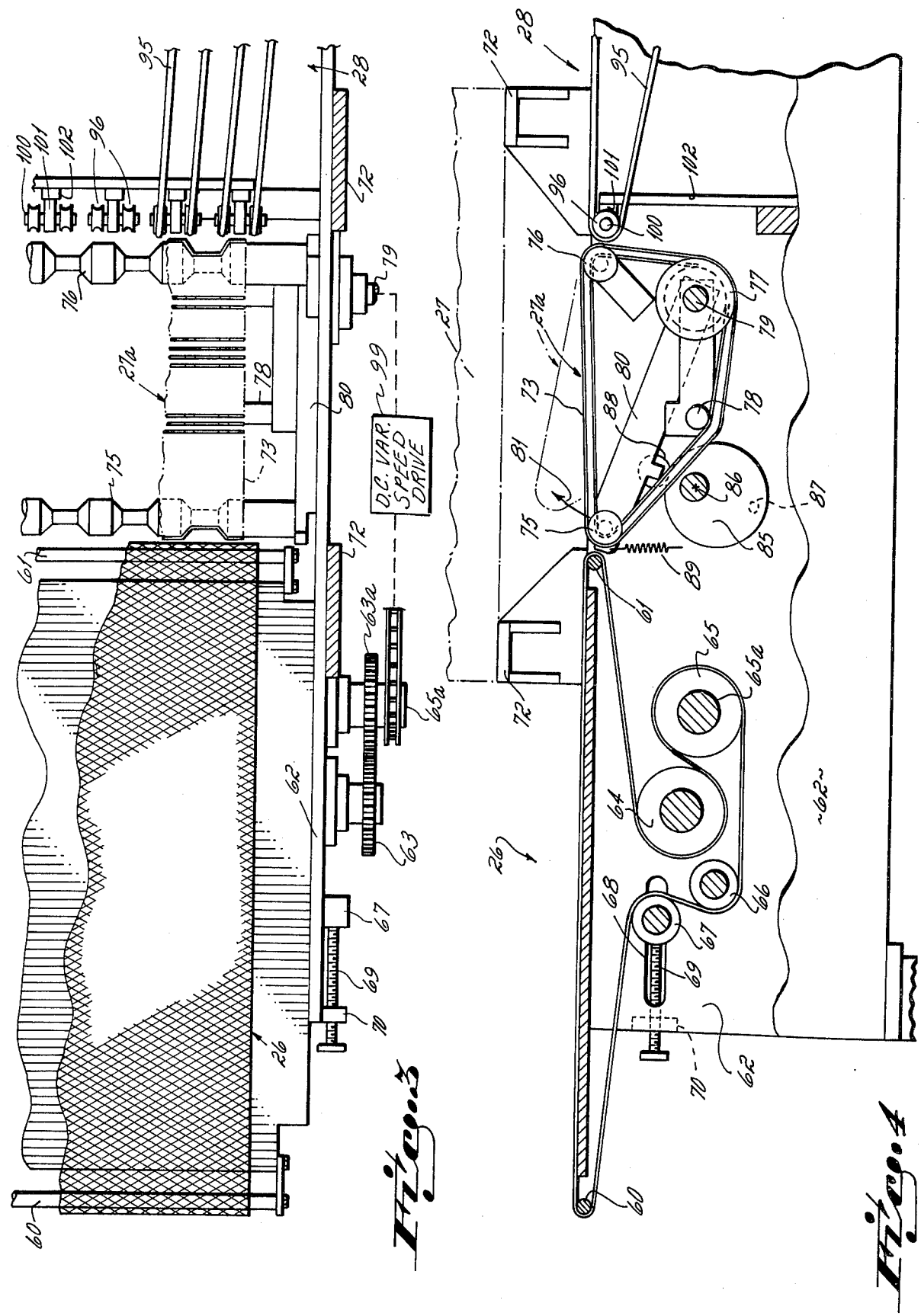

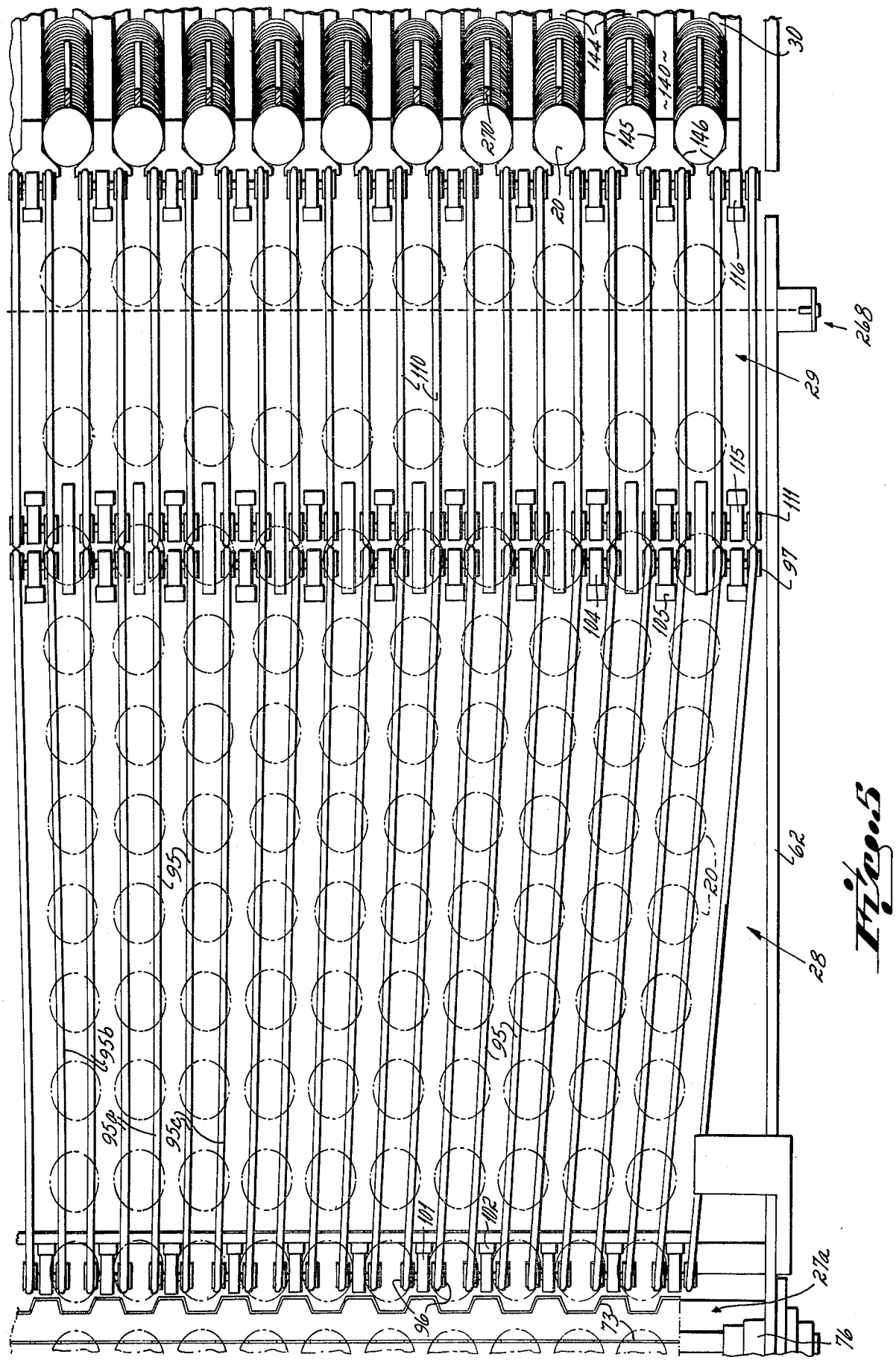

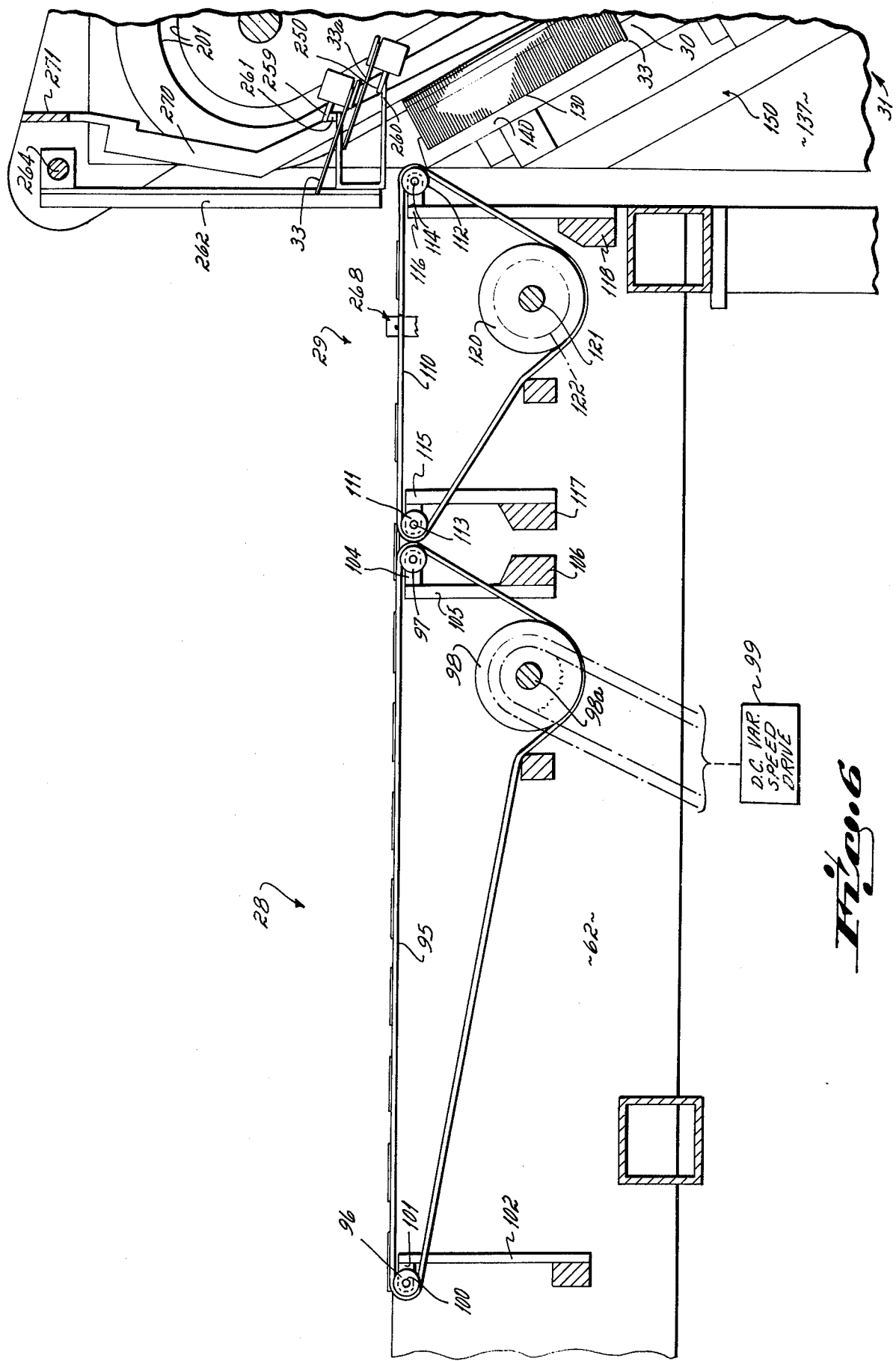

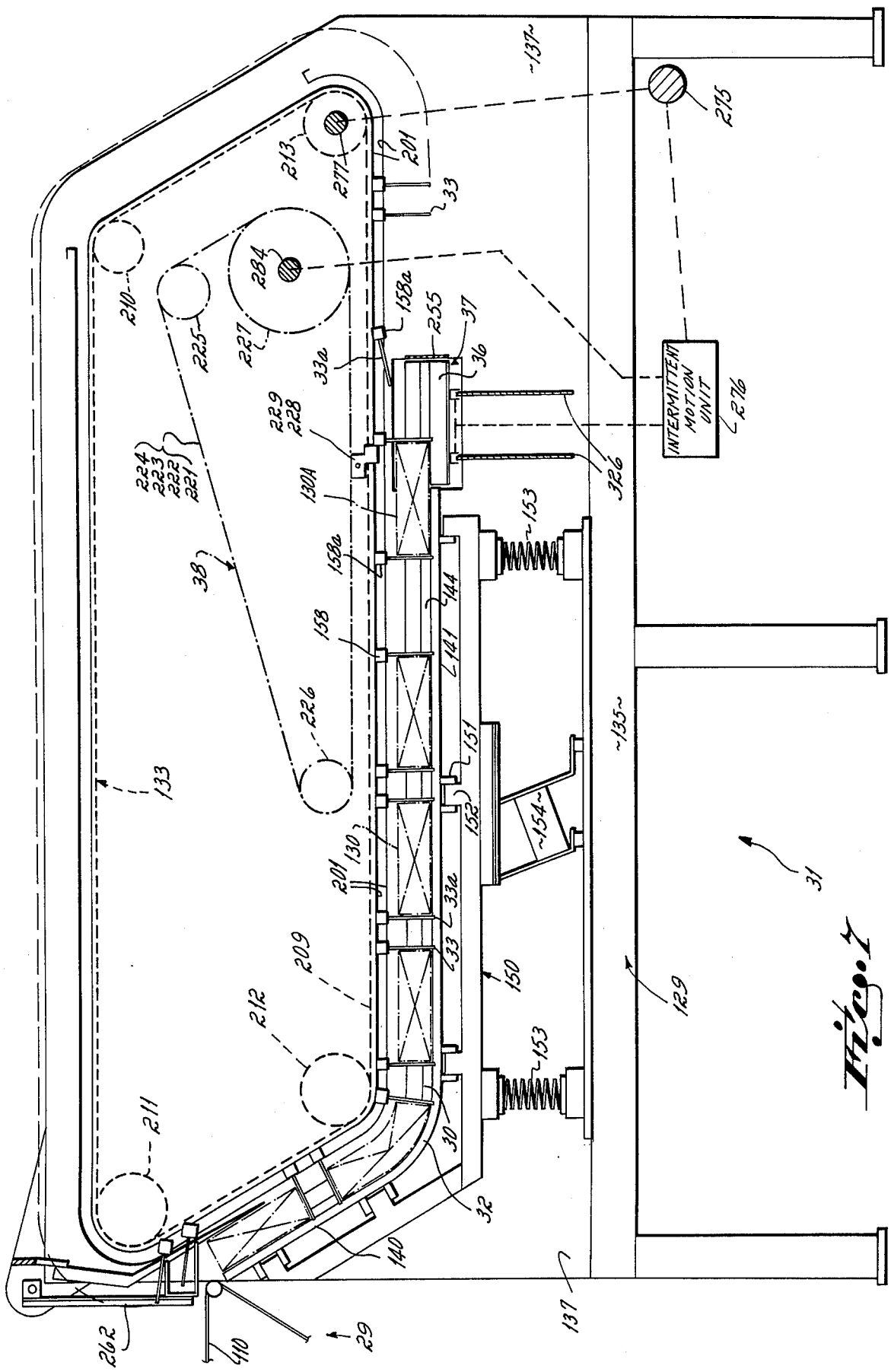

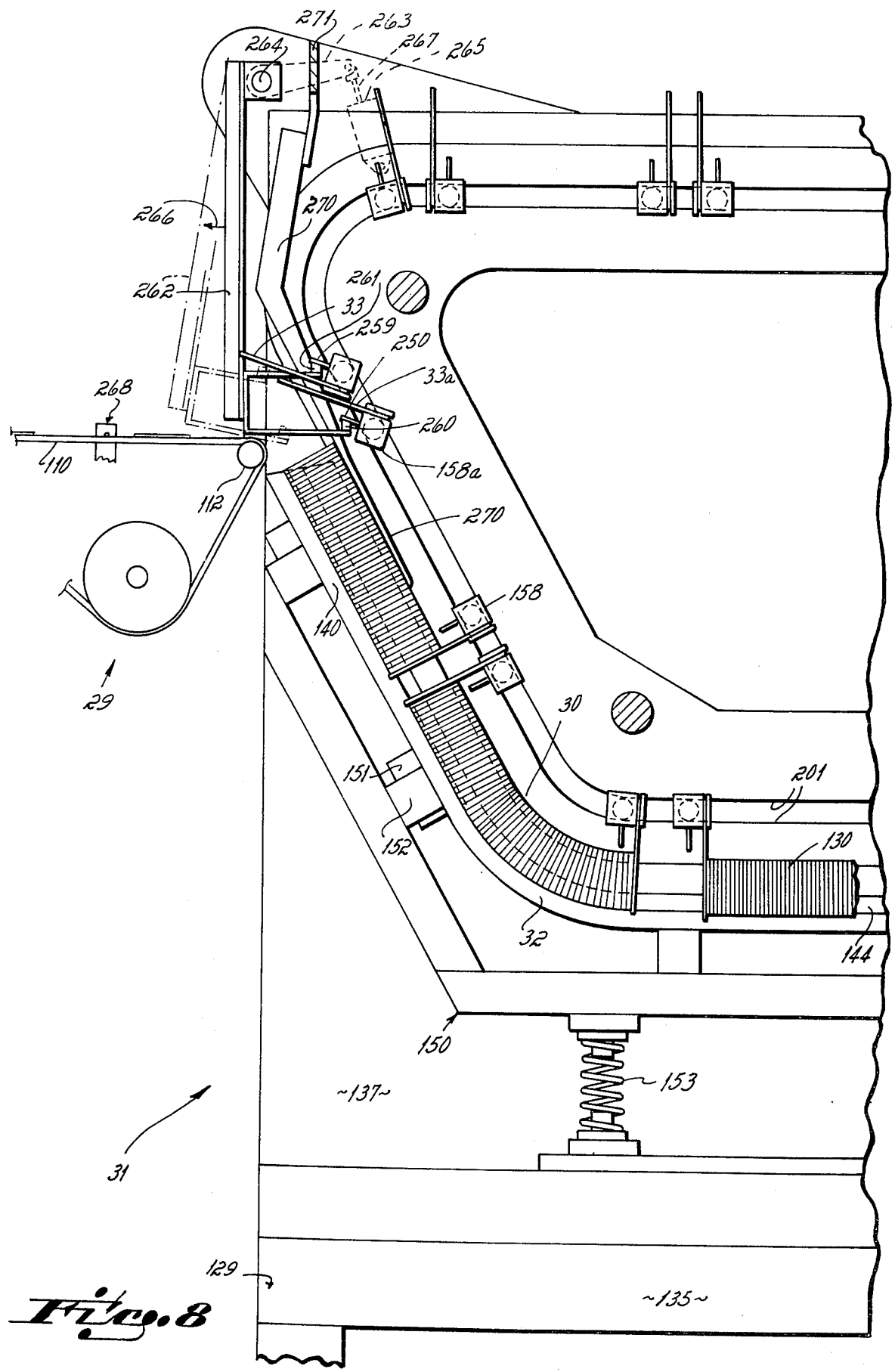

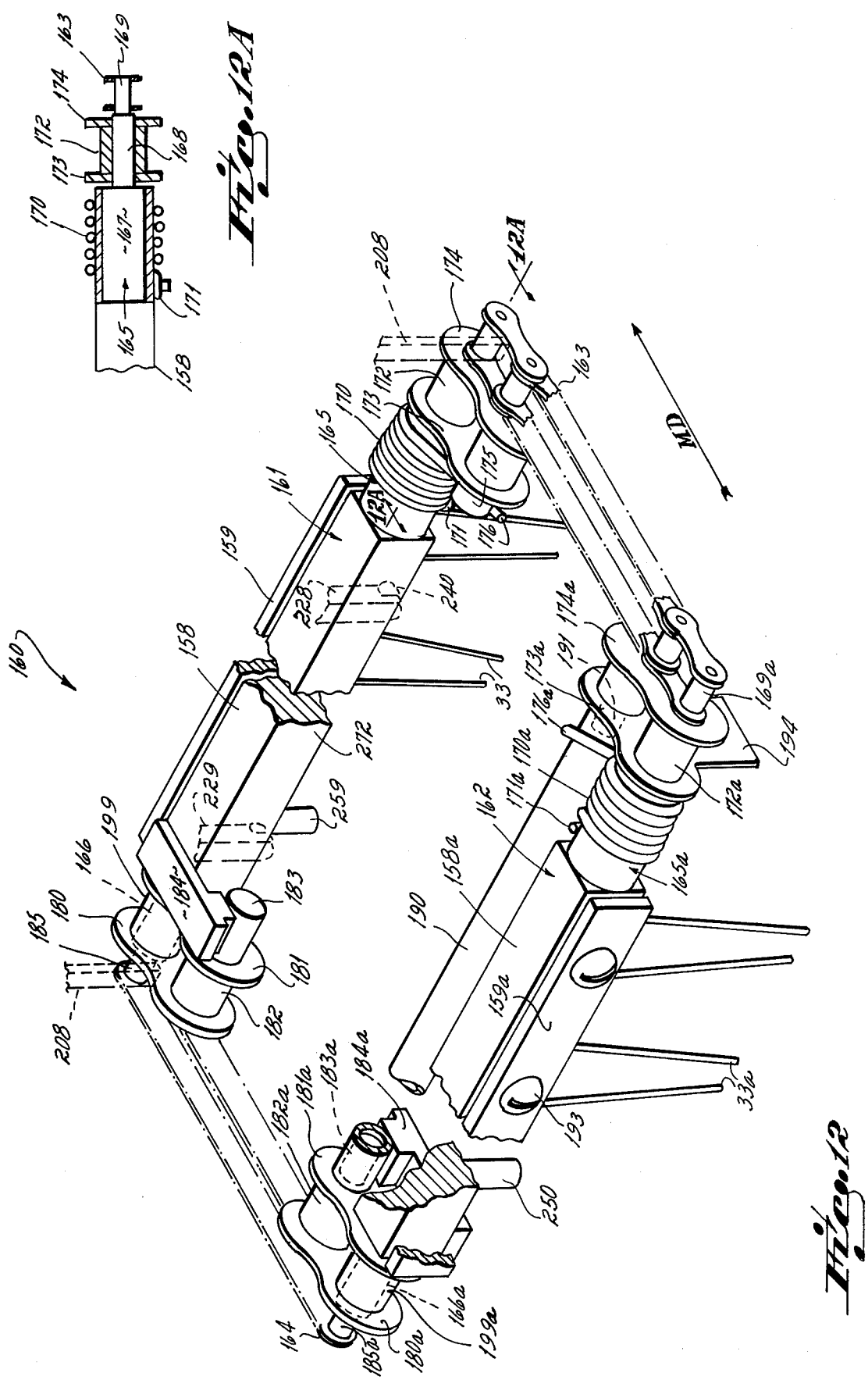

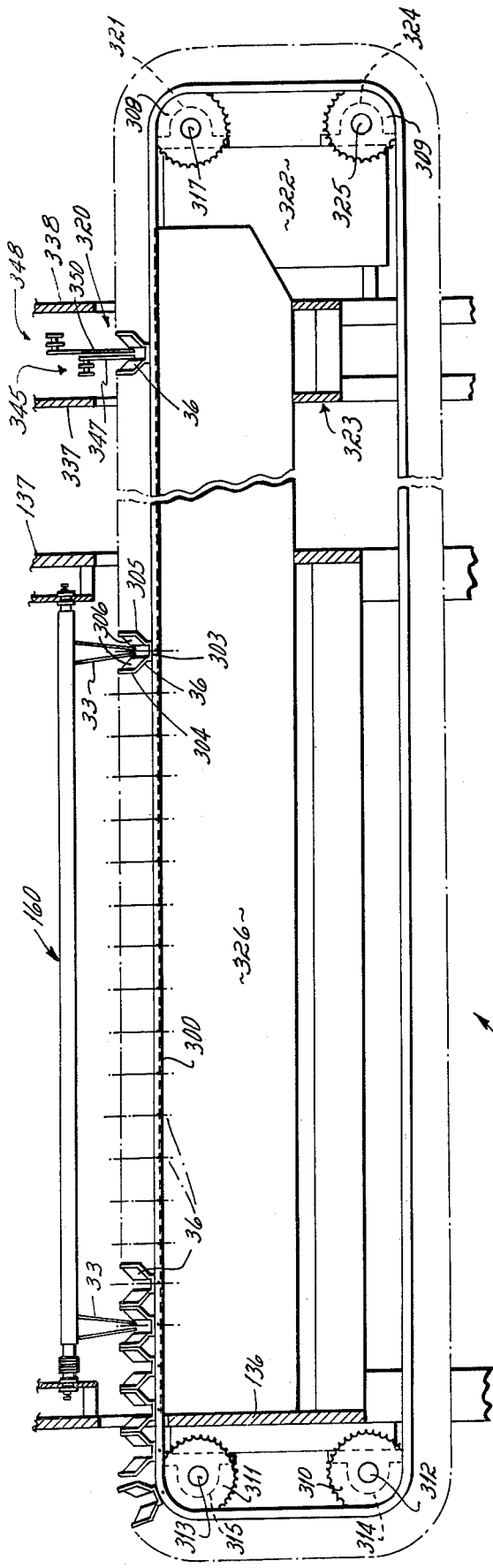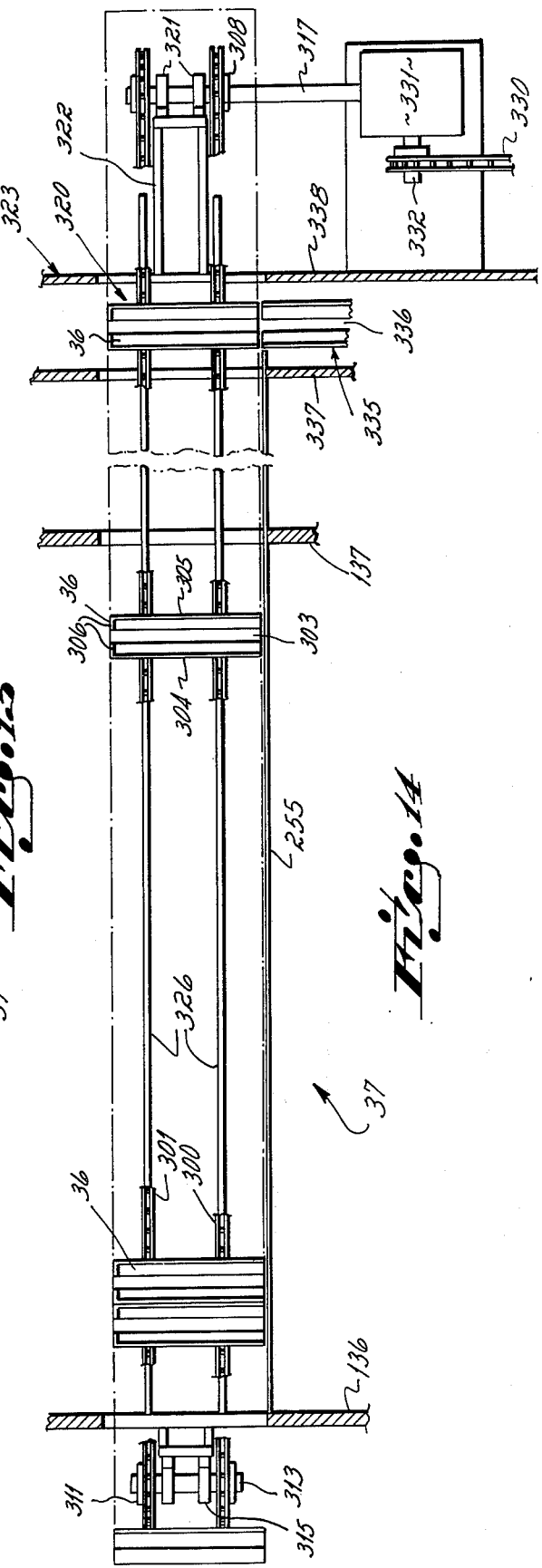

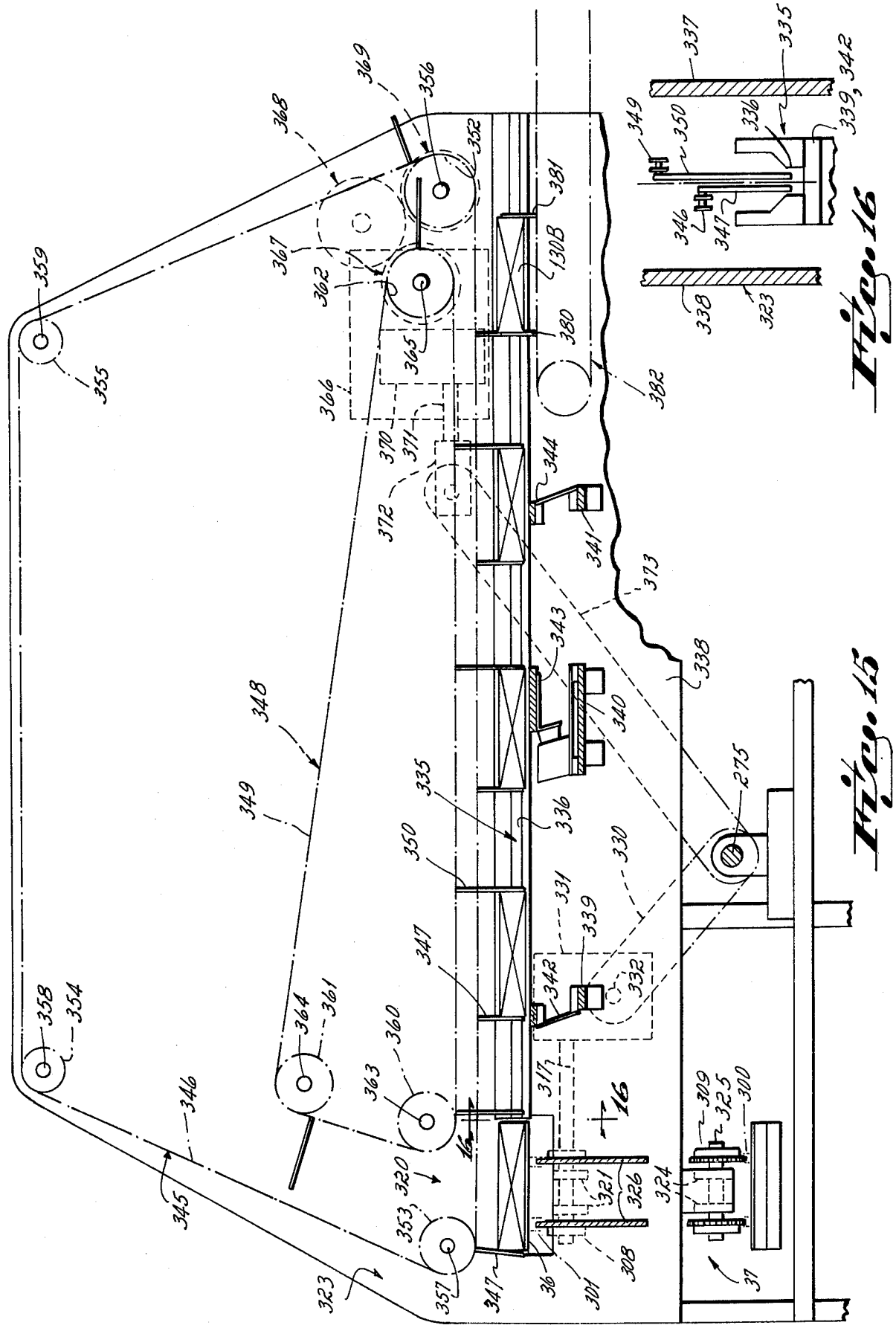

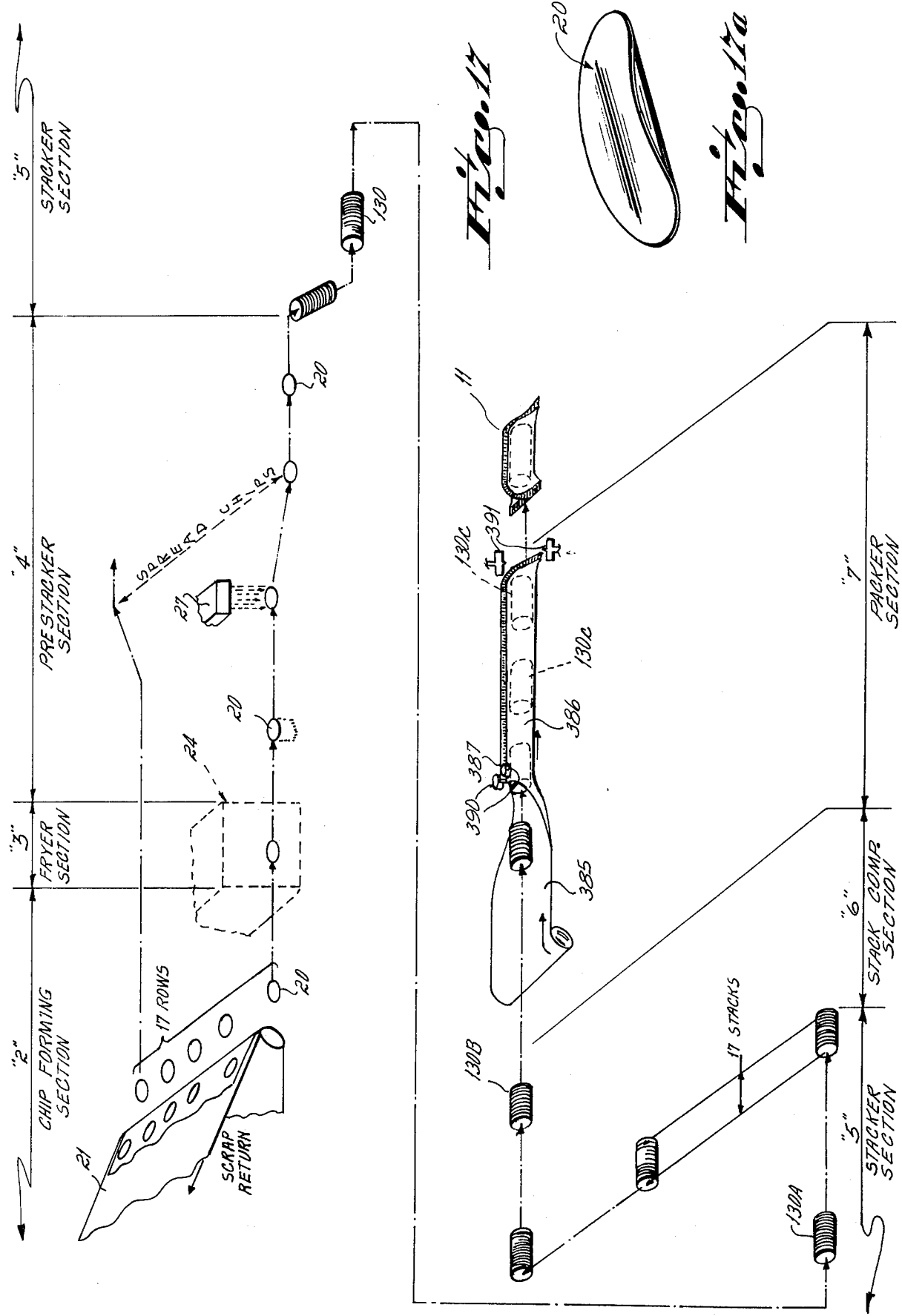

APPARATUS FOR PRODUCING AND PACKAGING FOOD CHIPS

This invention relates to an apparatus for making potato chips from reconstituted potatoes which have been ground into potato flakes and then subsequently mixed with water to create a potato dough.

The manufacture of potato chips from reconstituted potatoes is well known and commercially practiced. As presently practiced the processing involves sheeting dough made form dehydrated potato flakes and cutting it into dough chips. The dough chips are then sandwiched during frying between molds which define the completed potato chip shape. Alternatively, the potato chips may be fried and then shaped within a few seconds after emerging from the deep fat frying path. The shaped potato chips are then shingled and inserted into a rigid tubular container. According to this prior art process stacking of the potato chips occurs as the potato chips are inserted into the rigid package.

The commercial practice described hereinabove is advantageous over prior practices of slicing potatoes and then frying the resulting product to achieve randomly shaped chips because it eliminates storage of the raw potatoes and facilitates stacking and shipping of the chips as a compact unit. So stacked and packaged the chip products may be more compactly transported and displayed for sale. Because the chips are compactly stacked in the packages they may advantageously be shipped and handled with far less breakage than has customarily resulted from loose packaging of randomly shaped chips within a flexible, impermeable package.

It has been an objective of this invention to provide an improved apparatus for automatically stacking and packaging reconstituted potato chips, which improved apparatus substantially lessens the equipment and packaging cost heretofore incurred in manufacturing and packaging reconstituted potato chips.

Another objective of this invention has been to provide an improved apparatus for automatically manufacturing and packaging reconstituted potato chips which enables those chips to be assembled into a stack and then packaged within a flexible, impermeable wrapper such that the resulting product may be transported and sold without having to be packaged within a rigid sealed tube.

In the practice of this invention, ground potato flakes and water are fed together to a mixer wherein they are blended to form a thick dough. The mixer incorporates paddles projecting radially from a rotatable shaft in a mixing chamber, the paddles having pitches which are adjustable and which increase from paddle to paddle along the length of the shaft from an inlet end of the mixing chamber to an outlet end. The low pitch of the paddles at the inlet provides a cutting action which cuts or shears refed scrap dough; the progressive pitch increase of the mixing paddles increases the mixing action and accelerates the flow of dough toward the outlet. From the mixer, the dough is fed to a transversely oscillating diverter which spreads the dough more or less uniformly over the length of a three roll sheeter, wherein a thin sheet of dough is formed. The sheeter imparts a stress to the surface of the dough, such that the dough tends to curl into a curved shaped during subsequent frying. A rotary cutter stamps out disc-like chip shapes from the sheet and the scrap dough is returned directly to the mixer for reuse. The chips are carried from the cutter in parallel rows on a belt conveyor to a fryer. In the fryer, the chips are deposited on a continuous belt which carries them into a vat of hot oil for frying. The chips tend to float but they are prevented from doing so and at the same time assume a curved shape, defined by downwardly projecting contoured surfaces spaced closely above the belt on which the chips are carried. In the hot oil, the chips tend to curl upwardly and release the stresses built up in them during sheeting. The overhead mold surfaces uniformly limit the amount of upward curvature and the chips come out of the fryer uniformly curved with a "C" shape. After frying, the chips are seasoned with salt and are conveyed to a pre-stacker and aligner wherein they are ordered in parallel rows and the rows are spread apart laterally. At the end of the spreader, the chips are dropped one by one from the end of the conveyor into hockey stick like shaped chutes. As they fall, at an approximate 60° angle, they form stacks, and the stacks turn a corner so that they thereafter move along a horizontal path in face-to-face juxtaposition. Fingers prevent the chips from dropping until they are properly aligned and the first chip falls against and is supported by a moving finger. Subsequent chips then stack on this first chip. At the end of a predetermined time interval, an electric eye looks for an opening in the row of chips and a finger moves into place to provide an end carrier for the one stack followed by another finger which acts as a leading finger for the subsequent stack. The chips are randomly spaced along the rows and is no gap appears, the finger snaps across anyway and breaks a chip to create a gap, the broken chip falling into a waste chute. The chip stacks are subjected to a vibrating action to improve their nested relation as they are conveyed in the stacker, toward a series of buckets or short chutes arranged side-by-side on an intermittently moved conveyor which moves perpendicular to the longitudinal axis of the stacks. The rate of movement of the stacks is accelerated prior to arrival at the buckets so as to feed them quickly and simultaneously into the buckets while the buckets are stationary. The bucket conveyor then indexes sideways at such a rate that the filled buckets are all shifted out and additional empty buckets presented for filling before the next group of stacks is accelerated toward the buckets. The stacks of chips are withdrawn from the bucket sequentially in single file relation. The stacks are fed to a conventional packer through a stack compression conveyor. Within the packer the stacks are wrapped in a flexible vapor impervious foil or flexible package. The foil or flexible package stack or chips may then be placed inside either a conventional paper or cardboard container.

The primary advantage of this invention is that it enables potato chips made from reconstituted potatoes to be compactly stacked and then subsequently wrapped in flexible, impervious wrappers. Heretofore the stacking has always occured within rigid tubes into which the chips were inserted for packaging, with the result that the product was more loosely packaged and subject to breakage. Additionally those rigid tubes often required expensive corrugated liners to try to lessen that breakage, which liners are advantageously eliminated by the practice of this invention.

The invention of this application includes a novel stacker as well as a novel stack compression conveyor for first arranging a plurality of chips in loose face-to-face juxtaposition and then subsequently compressing the face-to-face juxtaposition stack. This novel stacker and stack compression conveyor are operative to tightly compress the stacks of chips such that the stacks may subsequently be wrapped in a flexible impervious wrapper in much the same manner that a stack of soda crackers are conventionally wrapped within a flexible impervious wrapper. Thus wrapped or packaged the product may be shipped in either a conventional pervious cardboard container or box, or in a flexible paper or film.

These and other objects and advantages of this invention will be more readily apparent from the following description of the drawings in which:

FIG. 1 is a top plan view of a machine incorporating the invention of this application.

FIG. 2 is a side plan view of the machine of FIG. 1.

FIG. 3 is a fragmentary top plan view of the drain and seasoning section of the apparatus of FIG. 1.

FIG. 4 is a cross sectional view of that portion of the apparatus illustrated in FIG. 3.

FIG. 5 is a top plan view of the pre-stacker and aligner portions of the apparatus of FIG. 1.

FIG. 6 is a cross sectional view through that portion of the apparatus illustrated in FIG. 5.

FIG. 7 is a partially diagrammatic cross sectional view taken on line 7—7 of FIG. 1 through the stacker section of the apparatus.

FIG. 8 is an enlarged cross sectional view taken on line 8—8 of FIG. 1 through the upstream portion of the stacker.

FIG. 12 is a perspective view of a portion of the stacker conveyor contained within the stacker section of the apparatus.

FIG. 13 is a cross sectional view through the transfer conveyor taken on line 13—13 of FIG. 1.

FIG. 14 is a top plan view of the transfer conveyor.

FIG. 15 is a partially schematic cross sectional view of the stack compression section of the machine taken on line 15—15 of FIG. 1.

FIG. 16 is a cross sectional view taken generally along line 16—16 of FIG. 15.

FIG. 17 is a diagrammatic illustration of the various sequential steps through which the chips are moved in the course of the practice of the invention of this application.

FIG. 17a is a perspective view of a potato chip used in the practice of this invention illustrating the general "C" shaped configuration of the chip after frying.

OVERALL ORGANIZATION

Figure 9:
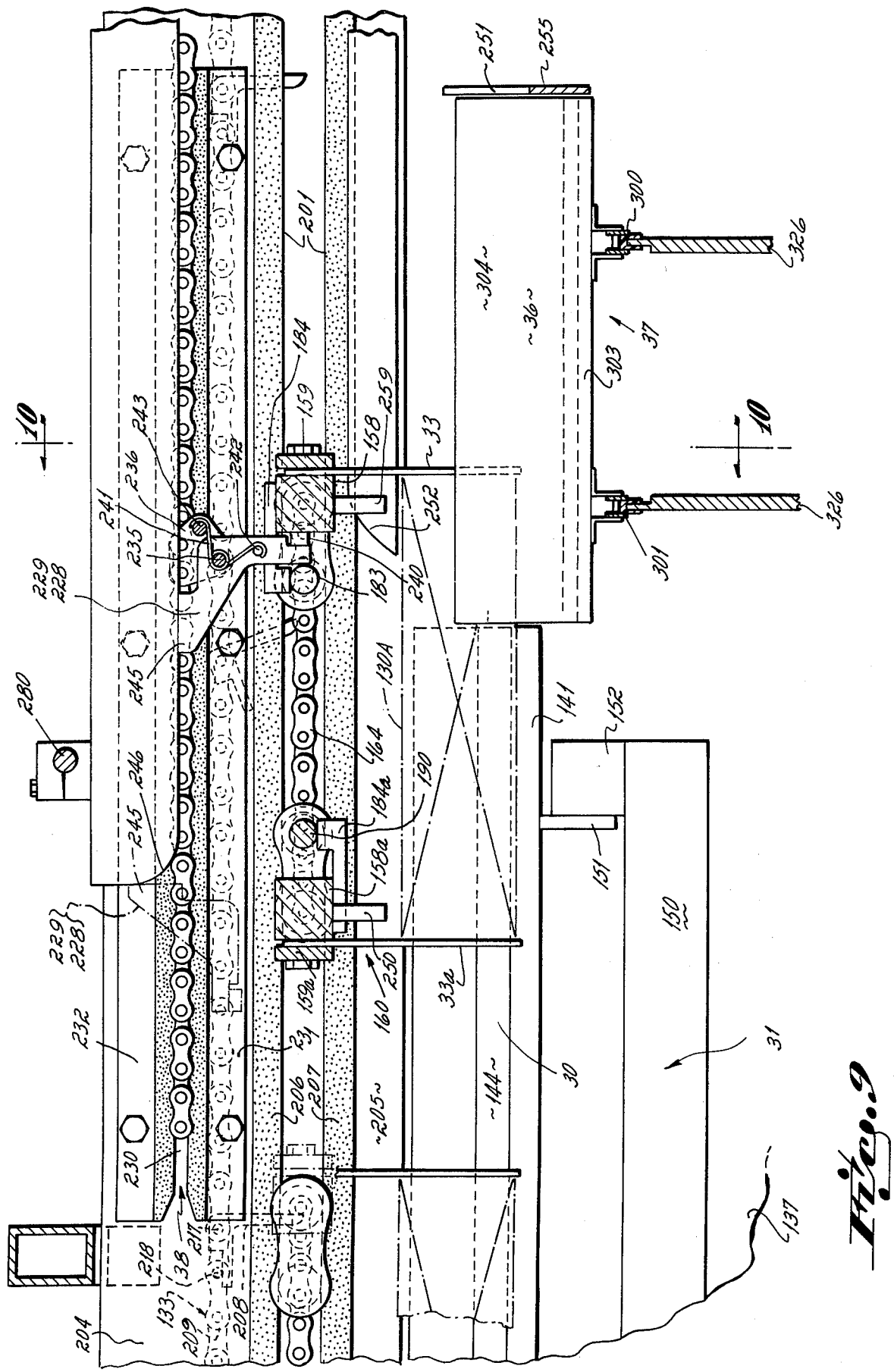
FIG. 9 is an enlarged cross sectional view of a portion of the stacker section of the apparatus.
Figure 11:
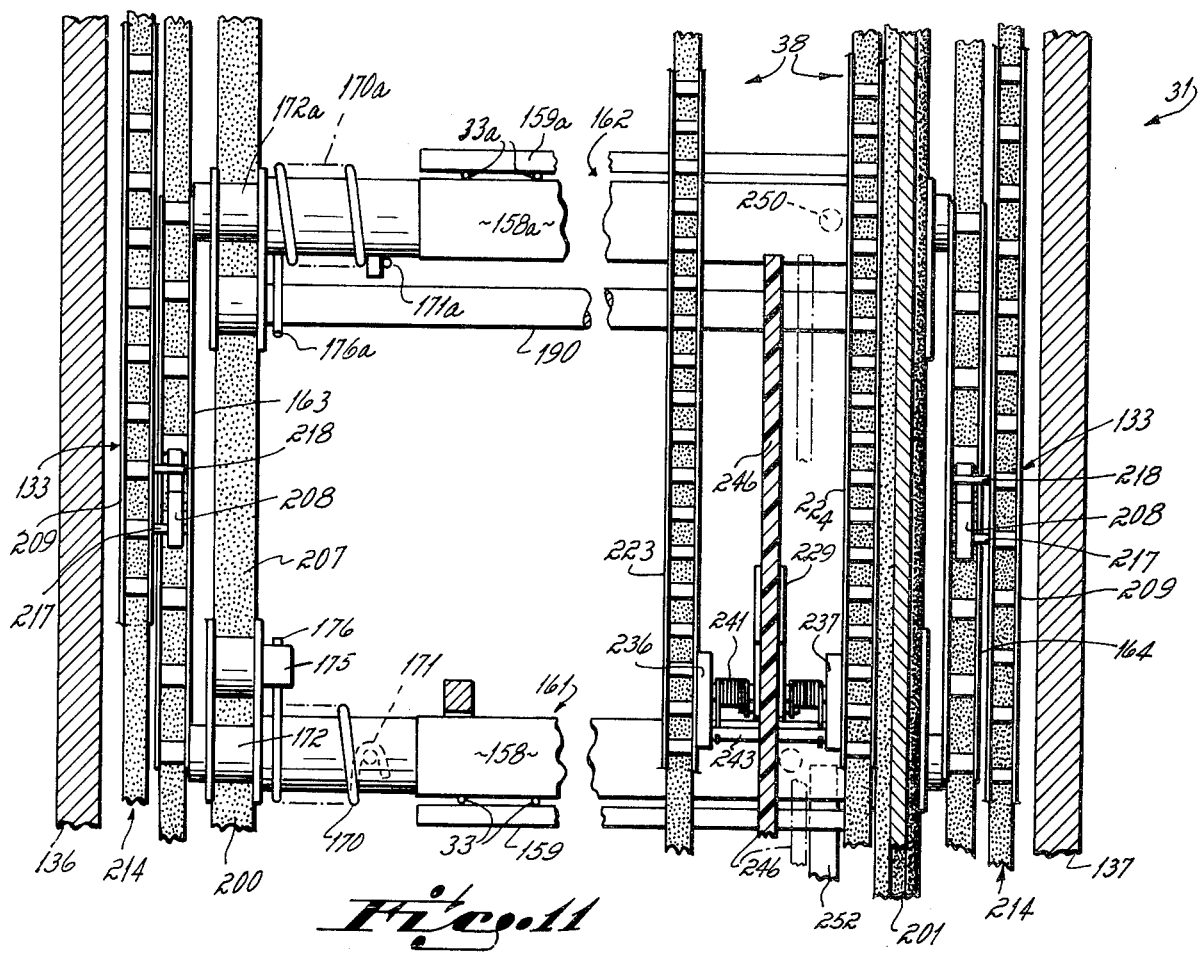
FIG. 11 is a cross sectional view taken on line 11—11 of FIG. 10.

Referring first to FIGS. 1, 2 and 17 there is illustrated a complete system 10 for conveting raw uncooked potato chip flakes into packages 11 of potato chips. This system is operative to mix the raw potato chip flakes which have been ground to a specific fineness with water and to cook and then subsequently package the chips in a flexible impermeable wrapper. The potato chip flakes per se (which are commercially available as a stable market commodity) as well as the dough mix made from the flakes form no part of the invention of this application.

In the practice of this invention, the potato chip flakes are continuously fed from a hopper 12 through a feeder 13 where the flakes are mixed with a predetermined quantity of water. The flakes and water are then fed into a continuous mixer 14 which is operative to mix the dough and water and to dispense it onto a diverter 15. The diverter includes a transversely oscillating arm 16 operative to spread the dough emerging from the mixer 14 uniformly over the length of a three roll sheeter 17. The sheeter 17 then produces a thin sheet of rolled dough which is dispensed from the roll sheeter onto a cutting conveyor 18. The cutting conveyor carries the thin sheet of rolled dough beneath a rotary cutter 19 which stamps out or die cuts disc like chip shapes 20 from the sheet. The scrap dough emerging from the cutting operation comprises a continuous perforated sheet which is then preferably returned to the mixer 14 via a scrap return conveyor 21. Alternatively, the scrap dough may be deposited in a grinder operative to regrind the scrap dough before it is returned to either the hopper 12 or the mixer 14.

The chips 20 are carried from the cutter 19 in parallel rows on a belt conveyor 23 to a fryer 24. In the fryer, the chips 20 are deposted on a continuous belt which carries them into a vat of hot oil for frying. The chips tend to float but they are prevented from doing so and at the same time assume a curved shape defined by downwardly projecting contoured surfaces of a holddown conveyor 25 within the fryer. In the hot oil, the chips tend to curl upwardly and release stresses imparted to the dough during the sheeting operation. The overhead contoured surfaces or mold surfaces of the conveyor 25 uniformly limit the amount of upward curvature imparted to the chips so that the chips come out of the fryer uniformly curved in a C-shape as illustrated in FIG. 17a.

After frying, the chips 20 pass over a drain conveyor 26 beneath a seasoner 27 operative to sprinkle salt onto the top surface of the chips. From the seasoner 27 the chips 20 are conveyed over a spreader 28 and aligner 29 wherein the chips are arranged in parallel rows and the rows are spread apart laterally. At the end of the spreader 28 and aligner 29, the chips are dropped one by one into hockey stick like chutes 30 of a stacker section 31 of the apparatus or system 10. As the chips fall through the chute 30 at an approximate 60° angle to a horizontal plane, they form stacks wherein the chips are arranged in face-to-face juxtaposition. The stacks are then conveyed around a corner 32 of the hockey stick like chutes 30 so that they thereafter move along a horizontal path in face-to-face juxtaposition while supported on a vertical edge of the chip within the chute. Within the hockey stick chutes 30 of the stacker 31, the chips are arranged in spaced stacks 130. As best seen in FIG. 7, the first chip of each stack falls against and is supported by a pair of moving fingers 33 of a stacker conveyor. These fingers of the stacker conveyor are best illustrated in FIG. 12. Subsequent chips then fall upon and stack above the first finger supported chip. At the end of a predetermined time interval, a pair of follower fingers 33a move into place to provide an end carrier for one stack followed by another pair of fingers which act as a leading finger for the subsequent stack. As the chip stacks 130 are conveyed through the stacker 31 within the chute 30, the chutes are subjected to a vibrating action to facilitate movement of the stacks through the chute and to improve the nested relation of the chips within the stack.

At the discharge end of the stacker 31, the chip stacks are transferred into buckets 36 of an intermittently movable bucket conveyor 37. This bucket conveyor 37 moves perpendicular to the longitudinal axis of the stacks in the stacker section of the machine. Just prior to arrival of the stacks of chips at the discharge end of the stacker and just prior to the stacks of chips being placed in the buckets 36 of the bucket conveyor 37, the rate of movement of the stacks is accelerated by an accelerator conveyor 38 of the stacker 31. This accelerator conveyor is operative to feed a row of stacks of chips quickly and simultaneously into the buckets while the buckets are stationary. The bucket conveyor then indexes transversely at such a rate that the filled buckets are all shifted out and additional empty buckets presented for filling before the next row of stacks of chips is accelerated toward the buckets.

The bucket conveyor 37 is operative to transport the rows of stacks of chips in side-by-side relation to a stack compression section 40 of the apparatus wherein the buckets are sequentially unloaded so as to locate the stacks of chips serially in single file on a conveyor of the stack compression section 40. As the stacks are transported in single file through the stack compression section 40, the length of the stack is shortened or otherwise expressed, the stack is compressed. The compressed stack is then transferred into a packer 41 wherein the individual stacks are wrapped within a continuous tube of flexible nonpermeable material such as wax paper or polyethylene film lined foil. The packer 41 is operative to seal the continuous side edge or seam of the tube and to close or collapse, cut and seal the tube in the area between the stacks of chips within the tube. The product which emerges from the packer 41 is thus an enclosed sealed stack of chips wrapped within a flexible impermeable wrapper.

Chip Forming Section

The chip mixing section 1 and forming section 2 of the apparatus disclosed in FIGS. 1 and 2 all comprise conventional commercially available equipment. Specifically, a hopper 12, feeder 13, and mixer 14 suitable for the practice of this invention may be purchased from Wenger International, Inc. of Kansas City, Mo. Alternatively, a preferred form of mixer useful in the practice of this invention is completely disclosed in my co-pending patent application entitled "Dough Mixer" filed on even date herewith.

The diverter 15, roll sheeter 17 and cutter 19 are also all conventional commercially available equipment. One suitable diverter, three roll sheeter, and cutter useful in the practice of this invention is manufactured and sold by Werner Lehara, Inc. of Grand Rapids, Michigan. The diverter 15 includes a continuously moving conveyor belt 50 movably mounted upon the horizontal arm 16 which oscillates about a vertical axis 51. The diverter is operative to deposit mixed dough on the top surface of the belt 50 and to dispense that dough relatively evenly over the nip 52 between two of the three rolls 53, 54, 55 of the three roll sheeter. Oscillation of the arm 16 precludes the dough from piling up in the center of the nip 52 between the rolls 53, 54. Dough dispensed from between the rolls emerges as a wide sheet onto a flat belt conveyor over which it is transported beneath the rotating cylinder 56 of the die cutter 19. The cylinder 56 has a plurality of disc shaped dies on its peripheral surface which are operative to cut the sheet of dough into a plurality of rows of dough chips. In the preferred embodiment the peripheral dies of the die cutter 19 are operative to cut 17 columns of dough chips from the sheet. The perforated sheet emerges from the die cutter as a continuously connected but perforated sheet which is then transported via a scrap return conveyor 21 back to the mixer. As an alternative to transporting the scrap back to the roller the scrap may be transported to a grinder and reground preparatory to being fed back into the hopper 12.

The 17 columns of dough chips are then fed via a belt conveyor 23 into the fryer section of the machine.

Fryer

The fryer section 3 of the apparatus used in the practice of this invention is also a conventional commercially available fryer. One such fryer suitable for the practice of this invention is manufactured by Heat & Control, Inc. of San Francisco, Calif.

In the preferred practice of this invention, the fryer 24 comprises an open mesh conveyor belt 57 upon which the chips are deposited as they are transported into a hot oil frying bath. The belt 57 has a flat top surface from which the columns of chips tend to float upwardly agains a closely spaced overhead conveyor 25. The overhead conveyor has 17 columns of downwardly projecting contoured convex surfaces located immediately above the 17 columns of chips passing through the fryer on the flat upper surface of the lower conveyor 57. A curved shape is imparted to the dough chips as they pass through the fryer as a consequence of the chips moving upwardly and curling about the convex depending surfaces of the upper conveyor 25. The overhead depending convex surfaces of the upper conveyor 25 thus act as a mold to uniformly limit the curl of the chips with the result that they all come out of the fryer substantially uniformly curled in a C-shape. This shape is best illustrated in FIG. 17a.

Pre-stacker

The pre-stacker section 4 of the system comprises four different conveyor sections, the first or upstream most conveyor section of which is a drain conveyor 26 of wire mesh through which grease is free to flow off of the product. The second or next downstream conveyor is the seasoning conveyor 27a upon which the product is seasoned by salt or other seasoning dispensed from a conventional seasoner 27. From the seasoning conveyor the product moves onto the spreader conveyor 28 where the 17 columns of fried chips are spread apart laterally as they are moved longitudinally over the spreader conveyor belts. From the spreader conveyor the columns move onto a high speed aligner 29 which is operative to pick up the fried chips as they come off of the spreading conveyor and to space the rows of chips longitudinally preparatory to stacking of the chips within the stacker 31 of the machine.

The drain conveyor 26 comprises a continuous wire mesh screen which passes over a rear idler roll 60 and a forward idler roll 61, both of which extend between side plates 62 of the pre-stacker frame. From the forward idler roll 61, the drain belt passes over a pair of large drive rolls 64 and 65, and a pair of idler rolls 66, 67. All of these rolls other than the idler roll 67 are fixedly mounted or journalled within the side plates 62 of the pre-stacker frame. The idler roll 67 though is supported within a horizontal slide 68 of the side plates 62 such that a threaded screw 69 extending through a fixed nut 70 may be adjusted so as to tension the screen. To effect drive to the drive rolls 64, 65, gears 63, 63a are drivingly connected to the ends of the drive roll shafts.

From the drain conveyor the 17 columns of chips move onto the seasoning conveyor 27a where the chips are sprinkled with salt from a conventional seasoner 27 located above the conveyor. The seasoner is mounted upon four brackets 72 affixed to the pre-stacker side of the frame plates 62. As the chips pass over the seasoner conveyor, they are supported upon a continuous open mesh belt 73. This belt rotates over and is supported by a pair of idler rollers 75, 75, a drive roll 77, and a slack take-up roll 78. The drive roll 77 is non-rotatably keyed to a supporting drive shaft 79. This shaft rotatably supports a pair of brackets 80 located at opposite ends of the shaft 79 just inwardly of the frame side plate 62. The rearwardmost one of the idler rollers 75 of the seasoning conveyor is supported between the two brackets 80 such that the rearwardmost roller may be moved upwardly in the direction of the arrow 81 (FIG. 4) out of the horizontal plane of the drain conveyor 26. In this way a gap may be established through which fried chips or product may be dumped into a bucket or other dispenser in the event that the machine becomes jammed or miscues downstream of the seasoner.

To move the idler roller 75 upwardly out of the horizontal plane of the drain conveyor, there is a cam 85 rotatably journalled upon one of the side frames 62 for rotation about an axis 86. This cam 85 has a crank arm 87 extending through the side frame plate 62 and exposed for rotation to the machine operator. Upon rotation of the crank 87, the cam 85 is caused to rotate about the axis 86 thereby causing a roller 88 attached to the underside of one of the pivot arms 80 to be cammed upwardly. In this way the pivot arms 80 are moved upwardly against the bias of a tension spring 89 so as to lift the rear idler roller 75 to a position in which product passing over the drain conveyor may fall into a scrap bin located beneath the seasoning conveyor 27a.

Before the rows of seasoned and fried potato chips can be stacked in the stacker section 31 of the machine, they must be spaced apart both laterally and longitudinally a greater distance than they emerge from the seasoning conveyor 27. To that end, the spreader conveyor 28 and the aligner 29 are provided. The spreader conveyor comprises a series of endless belts or tubes 95 which are supported at the rear upon idler rollers 96 and at the forward or downstream end upon roller 97. These tubes or belts are driven from a drive roll 98 over which the tubes pass on the underside or return run of the conveyor. Preferably, there are a pair of laterally spaced ropes or tubes which support the lateral edge of each chip as it passes over the spreader conveyor 28. In the preferred embodiment there are 36 single ropes 95, the outermost ropes not being utilized. Since there are 17 columns of chips there must of necessity be at least 34 parallel conveyor ropes transversely spaced across the width of the conveyor.

The rear idler rollers 96 are supported upon idler shafts 100 which are in turn mounted upon brackets 101 affixed to a transversely extending plate 102. This plate extends between the side plates 62 of the pre-stacker section of the machine and is supported from those side plates. At the forward or upstream end, the tubes of the spreader conveyor are similarly supported upon idler rollers 97 which are in turn supported from brackets 104. The brackets are in turn mounted upon vertical bars 105 affixed to a transverse vertical bar 106 of the pre-stacker frame.

With reference to FIG. 5 it will be noted that the potato chips passing longitudinally over the spreader conveyor 28 are supported between pairs of tubes or ropes with the lateral edges of each chip (shown in phantom) supported upon one of the pairs of ropes 95. It will also be noted that the pair of ropes or conveyors 95a which support the centermost column of potato chips runs longitudinally along the axis of the spreader conveyor while the adjacent pairs of ropes or conveyors 95b and 95c on opposite sides of that centermost conveyor section 95a diverge away from the centermost pair of ropes in a downstream direction. Similarly, those pairs of ropes spaced further outwardly diverge still further in the downstream direction so that the potato chips which emerge from the downstream end of the spreader conveyor are spaced apart a greater distance than the rows of potato chips fed onto the spreader conveyor at the upstream end.

From the spreader conveyor, the 17 columns of potato chips are conveyed via a high speed alignment conveyor 29 to the stacker section 31 of the machine. The alignment conveyor also comprises pairs of parallel endless belts operative to convey the chips while supported on their lateral edges by the belts into the next section of the machine.

The alignment conveyor 29 also utilizes 34 of the 36 endless ropes or belts 110 aligned in end-to-end alignment with 34 of the belts 95 of the spreader conveyor 28. These belts 110 of the aligner are supported for rotation at their rear or upstream end upon idler rollers 111 and at their downstream end upon idler rollers 112. These rollers 111, 112 are all supported upon idler shafts 113, 114 respectively which in turn are mounted in supporting blocks 115, 116. The supporting blocks 115, 116 are supported from transverse bars 117, 118 of the machine frame. The belts 110 are all driven from a drive roll 120 which is drivingly keyed to a drive shaft 121. The drive shaft 121 is driven at a high rate of speed relative to the drive shaft 98a of the spreader conveyor such that the belts 110 of the alignment conveyor move at a much higher linear speed than the linear speed of the belts 95 of the spreader conveyor. Because the speed of the belts 110 is substantially greater, and in a preferred embodiment approximately twice the speed of the spreader conveyor, the alignment conveyor is operative to convey the chips on the conveyor 29 away from the forwardmost idler roller 97 of the spreader conveyor at a faster rate than the chips arrive at that idler roller. Consequently, a substantially greater distance is established between the rows of potato chips on the alignment conveyor than existed on the spreader conveyor or at any point in the system from the die cutter forward. This increased distance between the rows of potato chips is necessary in order for the stacker to properly operate without breaking chips in the course of establishing a gap between those chips which make up one stack of chips for subsequent packaging and the next following row, as is explained more fully hereinafter.

Both the drive shaft 98a of the spreader conveyor and the drive shaft 79 of the seasoning conveyor are driven by sprockets from a DC variable speed drive motor 99. That same drive motor is also operative to drive the drive shaft 65a of the drain conveyor. The drive shaft 121 of the alignment conveyor 29 is driven at a higher rate of speed than the conveyors 26, 27a and 28 by an independent drive motor shown schematically at 122 in FIG. 6. Since the chain and sprocket drives are completely conventional they have only been partially illustrated in FIGS. 3 through 6 wherein the pre-stacker section of the machine is otherwise completely illustrated.

Stacking Section

The stacking section 31 of the machine is operable to accept the 17 columns of potato chips from the pre-stacker section and to form them into 17 columns of stacks 130 of potato chips contained between fingers 33, 33a of stacking flights of the pre-stacker. The pre-stacker, after forming the chips into stacks 130 of face-to-face juxtapositioned chips, is operable to deposit those stacks in buckets 36 of the bucket conveyor 37 from whence they are moved to the compression section of the machine and subsequently into the packer, as is explained more fully hereinafter.

The stacker section of the machine comprises a frame indicated generally by the numeral 129, troughs or chip guides 30 for receiving and supporting the chips as they are moved through the stacker section of the machine, a constant speed flight conveyor 133 for effecting movement of the stacks or chips through the stacker section of the machine, and an intermittently movable accelerator conveyor 38 for rapidly moving the stacks of chips 130 into the intermittently movable bucket conveyor 37 without interference of the two conveyors, as is explained more fully hereinafter.

The frame 129 comprises a base section 135 and a pair of side plates 136, 137. The chip guides 30 are supported for vibratory movement from the base section 135 of the frame while the constant speed flight conveyor 133 and accelerator conveyor 38 are supported from the fixedly mounted side plates 136, 137.

The chip guides are generally shaped as hockey sticks and have an upper end portion 140 extending at an angle approximately 60° to a horizontal plane and a lower end section 141 located in a horizontal plane. The two sections are interconnected by the corner 32 which is formed by a large radius. The guides 30 are arranged in pairs opposed to each other such that each pair forms a trough 144 through which the stacks 130 of chips move in the course of passing through the stacking section of the machine. As may best be seen in FIGS. 5 and 10, all of the guides 30 are generally T-shaped in cross section. The distance between the vertical edges 145 of opposed chip guides 30 is just slightly greater than the width of the fried potato chips. Consequently, the chips are supported from the sloping surfaces 146 upon which the bottom edges of the chips rest and the side edges of the chips are supported against the vertical walls 145 of the guides.

The chip guides 30 are all supported from a vibrator frame 150 located beneath the guides 30. Each guide has ears 151 depending from its bottom surface by means of which it is attached to upstanding brackets 152 of the vibrator frame 150. The frame 150 is in turn mounted upon the base frame 135 through compression springs 153. Consequently, the vibrator frame 150 and chip trough supported therefrom are free to move in response to vibratory motion imparted by a vibrator 154.

The vibrator 154 is a conventional commercially available vibrator which is affixed at the bottom to the frame 135 and attached at the top to the underside of the frame 150. When a motor contained within the vibrator 154 is operated it causes the vibrator and the attached vibrator frame 150 to be rapidly vibrated at a preset frequency without imparting vibrator movement to the frame 135. Because of the vibratory movement of the frame 150 and the attached chip troughs 144, the fried potato chips move through the troughs in face-to-face juxtaposition without the edges of the chips becoming worn or chipped. The vibratory movement of the guides 30 also causes the chips to move relative to each other an amount sufficient to place the chips as closely as possible in edgewise alignment. In other words, the vibratory movement causes the chips to vibrate relative to each other to a position in which each chip is nested as nearly as possible in edgewise alignment with the chips against which it is resting.

In order to effect movement of the chips through the stacking section of the machine and along the trough 144 as spaced stacks of chips, the stacker section of the machine includes the constant speed flight conveyor 133 and the accelerator conveyor 38. The constant speed conveyor propels the conveyor flights 160 through the upstream end of the stacker until those flights are picked up and moved rapidly by the accelerator conveyor 38 past the bucket conveyor. The accelerator conveyor then continues to move the flights forwardly until they are again picked up by the constant speed conveyor and brought back overhead to the upstream end of the machine.

The transport flights 160 of the stacker section of the machine are best illustrated in FIG. 12. As there illustrated, each flight comprises a front transport bar assembly 161 and rear transport bar assembly 162. The two assemblies 161, 162 are interconnected by conventional link chains 163, 164. Functionally, both bars carry 17 sets of depending pins 33, 33a operative to ride within the troughs 144 defined by the chip guides. The front sets of pins 33 ride through the troughs and constrain the first or forwardmost chips in a stack 130 while the rear pins 33a ride within the same trough and function to push the stacks through the trough 144.

The front transport bar assembly of each flight 160 comprises a rectangular cross sectional bar 158 which extends for nearly the full width of the machine. This bar has attached to its front face a presser plate 159 between which the pins 33 are sandwiched such that when screws (not shown) are tightened the pins 33 are clamped between the presser plate 159 and the bar 158. At its outer ends the bar 158 terminates in cylindrical pins 165, 166. Pin 165 has cylindrical sections 167, 168 and 169 of decreasing diameter. The larger inboard section 167 supports a torsion spring 170, one end of which 171 is attached to the cylindrical section 167 of the transport bar and the opposite end of which is fixed against rotation as is explained more fully hereinafter. The intermediate diameter cylindrical section 168 of the transport bar 158 supports a guide bushing 172 and a pair of chain links 173, 174. These same chain links 173, 174 support a stub shaft 175 which extends inwardly of the link 173 and functions as an anchor for one end 176 of the torsion spring 170. As is explained more fully hereinafter the bushing 172 and the stub shaft 175 ride within guide tracks attached to the side plates 136, 137 of the frame. The small diameter end section 169 of the transport bar 158 functions as an anchor or drive pin for the chain link belt 163 which ties the front transport bar 158 to the rear transport bar assembly 162.

At the opposite end from the cylindrical section 165 the transport bar 158 terminates in a two diameter cylindrical section 166. The larger diameter section 166 supports a bushing and pair of chain links 180, 181 identical to the bushings 172 and links 173, 174 on the opposite end. The links 180, 181 in turn support a stub shaft 182 which has an inner end 183 extending inwardly from the inner link 181. This stub shaft is engageable with a stop 184 attached to the top of the transport bar 158 to limit rotational movement of the transport bar 158. The outer small diameter section 185 of the cylindrical section 166 of the bar 158 functions as an anchor or attachment point for the end link of chain 164 which ties the opposite end of the front transport bar assembly to the rear transport bar assembly 162.

The rear transport bar assembly 162 is very nearly identical to the front transport bar assembly except that it faces rearwardly rather than forwardly. Specifically, it includes a rear transport bar 158a identical to the front transport bar 158. This rear transport bar 158a also has end cylindrical portions 165a, 166a identical to the end sections 165 and 166 respectively of the front bar. It also includes a torsion spring 170a anchored at one end 17a to the end portion 165a and at the opposite end secured against a spacer bar 190. This bar functions, as is explained more fully hereinafter, as a stop bar to limit rotation of the rear transport bar assembly 162 and as a stop for the free end 176a of the torsion spring 170a.

On one outer end the rear transport bar 158a supports the chain links 173a, 174a and terminates in a small diameter pin 169a to which the last link of the link belt 163 is attached. At its opposite end the rear transport bar 158a terminates in a cylindrical section 166a over which the links 180a, 181a are mounted. The rear transport bar terminates in an end section 185a to which the trailing link of the link belt 164 is secured. The pins 33a of the rear transport bar assembly are clamped to the rear transport bar 158a by a rear clamping plate 159a. This clamping plate is secured to the rear face of the bar 158a by threaded connectors 193.

As in the case of the front transport bar assembly, the chain links 173a, 174a support a pin 191 which extends inwardly from the links 173a, 174a. The links 180a, 181a support a pin 183a which extends inwardly from the link 181a. The spacer bar 190 is mounted over these pins 191, 183a. Secured to the underside of the spacer bar 158a there is a stop bar 184a. This stop bar is engageable with the spacer bar 190 to limit rotational movement of the rear transport bar 158a as is explained more fully hereinafter.

The tranport flights 160 are mounted between and upon the side plates 136, 137 of the machine frame. When so mounted the bushings 172, 175 and 172a, 175a at one end of the transport flight ride within a trackway 200 attached to one side plate 137 of the frame and the bushings 199, 182, 199a and 182a ride within a trackway 201 attached to the side plate 136. As may best be seen in FIG. 7 these trackways 200, 201 define a generally parallelogram shaped pathway through which the flights are transported. As explained more fully hereinafter movement of flights 160 through the machine is effected by both the constant speed conveyor 133, which pushes the drive pins 169, 185 through the parallelogram shaped trackway at a slow speed, and by the high speed accelerator conveyor 134 which periodically pushes the front transport bar 158 at high speed through a portion of the parallelogram shaped pathway. As explained more fully hereinafter, periodically in the travel of the transport flights 160 through the parallelogram shaped pathway, hold bars or cams enter in front of pins 250, 259 depending from the flight bars 158, 158a and cause those pins and the attached flight bars to be cammed rearwardly against the bias of the springs 170, 170a. When so cammed the flight bars 158, 158a pivot about the pins contained within the bushings 172, 199 and 172a, 199a respectively. When those pin engaging hold bars no longer impede the forward travel of the pins 250, 259 those pins and the attached flight bars 158, 158a immediately pivot or snap back to the position illustrated in FIG. 12 wherein the stop bars 184, 184a engage the pins 183 and spacer bar 190 respectively.

The parallelogram shaped trackways 200, 201 followed by the transport flights 160 are defined by identical tracks affixed to the side plates 136, 137. Since the two tracks 200, 201 are identical, only one track 200 will be described in detail, it being understood that the track affixed to the opposite side plate 136 is identical to that being described.

The track 200 comprises an upper trackway 204 and a lower trackway 205 affixed to the frame side plate 137. The inner edges of the two trackways 204, 205 have nylon or friction resistant guides 206, 207 attached to their inner edges. The inner edges of these guides are spaced apart a distance just slightly greater than the diameter of the bushings 172, 175, 172a and 175a which ride between the guides.

Figure 10:
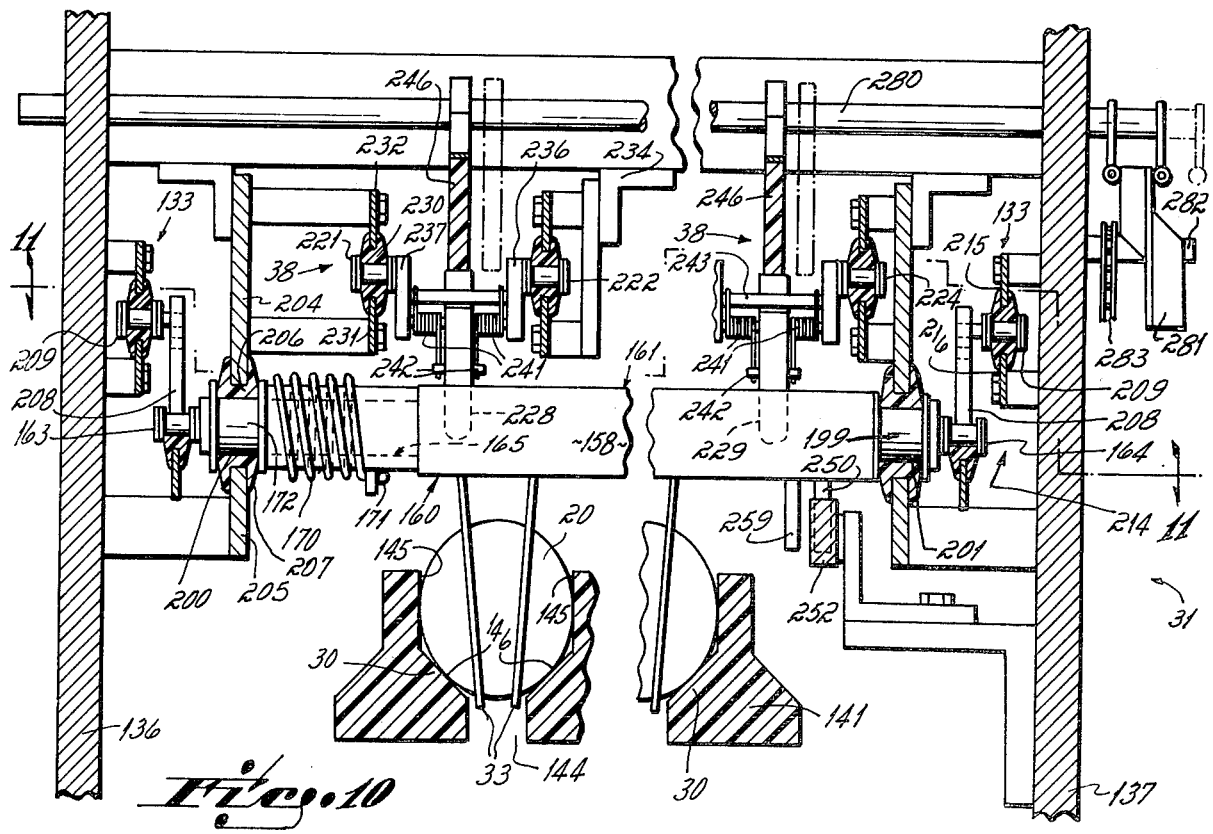
FIG. 10 is a cross sectional view taken on line 10—10 of FIG. 9.

Drive to the transport flights 160 by the constant speed conveyor 133 is effected by drive dogs 208 which depend from drive chains 209. There are two identical drive chains 209 which carry drive dogs 208 located on opposite sides of the machine and mounted upon the side plates 136, 137. Since the chains and dogs are identical, only one will be described in detail herein. With reference to FIGS. 7, 9 and 10 it will be seen that the drive chain 209 moves over a path parallel to and spaced outwardly from the trackway 200. This chain moves over three idler sprockets 210, 211 and 212 and a drive sprocket 213. To prevent sagging of the chain 209 between the sprockets it rides within a track 214 defined by upper and lower trackways 215, 216 attached to the side plate 137.

The drive dogs 208 depend from drive pins 217 attached to the drive chain 209. The pins 217 and the dog 208 are pivotally supported from the pins 217 such that they pivot in a counterclockwise direction as viewed in FIG. 9 but are restrained against pivotal movement in a clockwise direction by a pin 218. The drive dogs 208 are operative when engaged with the pins 169, 185 of the front transport flight bar 158 to push that pin forwardly. However, as is explained more fully hereinafter, when the acceleration conveyor drive dog engages the flight bar 158 and pushes it forwardly at a faster rate than the drive dog 208 travels the drive dog 208 is free to pivot in a counterclockwise direction, shown in FIG. 9, so as to move out of the way of the faster moving flight bar chain and not impede forward movement of the transport flights 160.

The constant speed conveyor moves the flights and consequently the stacks 130 of potato chips through the horizontal section 141 of the chip guides 30 toward the buckets 36 of conveyor 37 at a relatively slow constant speed. That slow speed movement of the stacks of chips 130 must be converted to high speed intermittent movement before the chips reach the bucket conveyor in order that the bucket conveyor may move the chips in a direction transverse to the longitudinal movement of the flight bars 158, 158a without interference between the two conveyors. To that end the relative high speed intermittent accelerator conveyor 38 is operative to transport the stacks of chips 130 over the downstream end of chip guides very quickly into the bucket 36 before the arrival of the next following stack of chips at the buckets. The bucket conveyor then has ample time to transport the 17 stacks of chips contained in the buckets 36 to the stack compression conveyor 40 and sequentially unload the buckets 36 onto serially aligned stacks before the arrival of the next following rows of stacks at the bucket 36.

The accelerator conveyor 38 comprises two pairs of accelerator conveyor drive chains 221, 222, 223 and 224 movable in an endless path of travel over idler sprockets 225 and 226 and over drive sprockets 227. Each pair of accelerator conveyor drive chains carries a single accelerator conveyor drive dog 228, 229. Since both pairs of chains and drive dogs are identical only one will be described herein, it being understood that the other identical chain and drive dog moves parallel to and in synchronization with the one which is being described herein.

Over the lower run of the drive chain 221, 222 it is prevented from sagging by a trackway 230 defined between tracks 231 and 232. These tracks are fixedly mounted to either the track 204 or a bracket 234 affixed to the frame of the machine.

With reference to FIG. 9, it will be seen that each drive dog 228, 229 is pivotally supported upon a pin 235. This pin is in turn supported from a pair of brackets 236, 237 attached to the pins of the chains 221, 222. The dogs 228, 229 of the accelerator conveyor are normally biased to the phantom line position of FIG. 10 in which the flight bar engaging wear pad 240 of the dog is located above the plane of the transport flight bars 158. This bias is imparted by a pair of torsion springs 241 located over the pivot pin 235 and is engageable at one end with a pin 242 of the dog and at the opposite end with a stop pin 243 which extends between the brackets 236, 237.

The dogs 228, 229 are generally L-shaped and have an upper can engageable leg 245 which, when engaged by a cam 246 forces the dog to pivot in a counterclockwise direction to a position in which the wear pads 240 are located in the horizontal plane of the flight bars 158. Because the accelerator conveyor chains move at a much faster rate than the constant speed conveyor 133 the accelerator chain drive dogs are operative to push the flight bars 158 forwardly away from the drive dogs 208 of the constant speed conveyor. Accelerator chain drive dogs 228, 229 thus move the forwardmost row of stacks of chips forwardly at a fast rate into the brackets 36 of the bucket conveyor 37.

A vertical stop plate 255 which is secured to the frame side plates 136, 137 stops the stack of chips 130 from passing through the buckets 36. Cutouts 251 in the stop plate 255 permit the lead fingers 33 of the flight bars 160 to pass through the plate. The rear fingers 33a swing in a clockwise direction, because the rear flight bar 158a is pivoted about its axis, so that the fingers 33a clear the top of the stack 130. Specifically, when the rear fingers 33a of the transport flight bar 158a are located in the plane of the trailing edges of the buckets 36 the rear fingers 33a are cammed rearwardly by a pin 250 secured to the rear transport bar 158a engaging a cam 252 located in the path of travel of the pin 250. The cam 252 causes the fingers 33a of the rear flight bar to be pivoted in a clockwise direction, as viewed in FIG. 9, so that the rear flight fingers 33a disengage the trailing potato chips in the bucket prior to the leading chip contained in that same bucket contacting the front stop plate 255. The rear flight fingers 33a are thereafter maintained in a horizontal attitude by the cam 252 until the fingers have passed the stack of chips 130 contained in the transfer buckets 36.

Operation of Stacker

There is one more set of drive dogs 208 located upon the constant speed conveyor 133 than there are transport flights 160 located within the trackway 200. The open drive dog is always located beneath the accelerator conveyor in order that there will be space for that flight being transported at high speed to the bucket conveyor to move without being impeded by the preceding flight.

All of the flights 160 except for that one being driven by the acceleration conveyor are driven by the dogs 208 of the constant speed conveyor engaging the pins 169, 185 of the front transport bar 158. Those drive dogs are operative to push the front flight bar through the trackway 200 and through the chains 163, 164 to pull the rear transport bar 158a through.

In the course of passing around the idler sprocket 211, the flight fingers 33a, 33 are caused to pivot rearwardly as is best illustrated in FIGS. 7 and 8. This rearward pivoting movement is effected by stops 260, 261 attached to a pivotally movable vertical bar 262 engaging the pin 250 attached to the rear transport bar 158a and a pin 259 attached to the front transport bar 158, respectively. The bar 262 is fixedly secured to a shaft 264 which is in turn pivotally mounted between the two side plates 136, 137 of the machine. At one outer end, the shaft 264 mounts a lever 263 which is attached to a movable rod 267 of a piston and cylinder 265. When the rod 267 of the piston and cylinder 265 is extended, the bracket 263 is moved upwardly so as to cause counterclockwise pivoting of the vertical bar 262 to the position shown in FIG. 8. Retraction of the rod 267 causes the bar 262 to pivot in a clockwise direction, as indicated by the arrow 266 (FIG. 8), and the stops 260, 261 are withdrawn from contact with the pins 250, 259, respectively, so that the fingers 33a, 33 of the flight bars may move downwardly as a consequence of the torsion springs 170a, 170 returning the bars to the normal position in which the stops 184a, 184 are engaged with their respective stop pins.

In order to prevent the rear flight bar assembly 158a from falling freely through the trackway 201 as the flight 160 moves between the idler sprockets 211, 212, the links 173a and 181a of the rear flight assembly have brake plates 194 (FIG. 12) depending therefrom. These brake plates are engageable with friction pads (not shown) secured to the inside surface of the side plates 136, 137 to retard or brake free fall of the rear flight bar through the slideway 201. Thus, the brake plates 194 and the friction pads with which those plates are frictionally engageable insure that the rear flight bar assembly 158a is always pulled through the trackway 201 and never allowed to fall freely through that trackway.

In the normal course of operation, 17 columns of fried potato chips are transported by the high speed alignment conveyor into the 17 troughs 144 defined by the chip guides 30. The first chip in a row of chips falls upon the flight fingers 33 of the front transport bar 158. Thereafter, subsequent chips in the same column of stacks 130 fall from the alignment conveyor into the trough onto the top of the chip which preceded it in that column. As the fingers 33a of the trailing flight and the fingers 33 of the next succeeding flight 160 reach the position where they would ordinarily block admittance of potato chips into the trough, the stops 260, 261 engage the pins 250, 259 and cause the fingers 33a, 33 of the trailing flight and next lead flight bars to be pivoted against the bias of the torsion spring 170a, 170 in a clockwise direction to the position shown in FIG. 8. Periodically in the travel of the stacker conveyor 133, a timer in a control circuit is actuated by either a cam or a conventional timer circuit, causing an electrical signal to be sent to an electric eye circuit having a light beam transmitter and receiver 268 located over the plane of the alignment conveyor 29. When this light beam completes its circuit indicating there is no chip in the path of the beam, the circuit to control the piston and cylinder 265 is tripped and a predetermined time thereafter equal to the time required for the last chip to travel from the light beam 268 into the troughs 144 of the chip guide, the piston and cylinder 265 is actuated, thereby withdrawing the stops 260, 261 from contact with the pins 250, 259. The fingers 33, 33a of the flight bars then snap downwardly to a position in which the fingers are normal to the trackways 200, 201. In this position the trailing fingers 33a move into contact with the last chip in the stack and the fingers 33 of the next following front transport bar move into a position to receive the next row of chips coming off of the aligner conveyor 29. This sequence is repeated each time the trailing transport bar of one flight and the next following front transport bar pass around the sprockets 211.

Upon withdrawal of the stop bars 260, 261 from in front of the stop pins 250, 259, the rear transport bar is located in a position to push the chips contained in front of the fingers 33a through the trough 144. The chip guides which define the troughs 144 are at all times vibrated by the vibrator 154 and the vibrator frame upon which the troughs are mounted. Consequently, chips falling into the trough are permitted to shift relative to each other and to find the natural position in which the chips are located one upon the other in edgewise alignment and face-to-face juxtaposition.

To prevent chips from falling out of the troughs 144 in a forwardly direciton, chip stops 270 are preferably mounted in a position to depend downwardly so as to define the front edge of the trough 144 at the entrance throat of the trough. These chip stops thus prevent chips from being thrown forwardly of the troughs 144 by the relatively high speed alignment conveyor 29. The stops 270 are preferably fixedly mounted to the frame as by a bar 271 which extends between the side plates 136, 137 of the frame.

Having entrapped a stack of chips between the flight fingers 33 of the front transport bar, and the rear fingers 33a of the rear transport bar, the transport flights move at a relatively slow speed forwardly through the troughs 144 of the chip guides. When the forwardmost row of stacks in the guides reach a predetermined point in their forward travel, the accelerator chain drive dogs 228, 229 engage the rear surface 272 of the front flight bar 158 and push that flight bar at a relatively high speed forwardly to a position in which that forwardmost row of stacks is located in buckets 36 of the bucket conveyor 37.

In the course of moving forward at a high speed, the pins of the chain belts 163, 164 cam the constant speed conveyor drive dogs 208 forwardly (see FIG. 9) as the chains move past the dogs. When the forwardmost row of stacks 130a is located within the buckets 36, the intermittent movement of the accelerator conveyor is temporarily halted.

In the preferred embodiment of the invention, the accelerator drive chain is driven at a high rate of speed much greater than that of the linear speed of the constant speed conveyor 133. In the preferred embodiment of the invention, the accelerator conveyor drive dogs make two complete revolutions or cycles while the constant speed conveyor moves a distance equal to the distance between two adjacent drive dogs 208 on the constant speed conveyor. In order to maintain the drives to the conveyor 133, 38 synchronized, both conveyors are driven from a single main drive shaft 275. This drive shaft is operative to drive the bucket conveyor 37 as well as the accelerator conveyor 38 through a conventional intermittent motion drive assembly 276. This intermittent motion drive 276 is effective to drive one while the other is stationary and then to reverse this so that the other moves while the previous one is stationary. The same main drive shaft 275 drives the shaft 277 upon which the drive sprockets 213 of the constant speed conveyor are mounted. Because the three conveyors, the constant motion conveyor 133, the accelerator conveyor 38 and the bucket conveyor 37, are driven from the same main drive shaft they always remain synchronized.

After having deposited a row of stacks 130a in the bucket conveyor 37, the accelerator conveyor pushes the now empty flight forwardly until the accelerator conveyor drive dogs pass around the drive sprockets 227 and becomes disengaged from the front transport bar 163. The next following drive dog 208 of the constant speed conveyor then engages the drive pins 169, 185 of the front flight bar and conveys the now empty flight through the machine back to the pick-up station adjacent the entrance throat of the chip guides.

Because the accelerator conveyor makes two complete cycles while the constant speed conveyor moves the distance between two drive dogs 208 on that conveyor, the drive dogs 228, 229 of the accelerator conveyor must be moved into an operative position to engage the front flight bar 158 of the transport flights only during every other revolution of the accelerator conveyor. To this end, the cams 246 which effect movement of the dogs 228, 229 into an operative position relative to the flight bars 158 are movable laterally upon a transversely movable bar 280. The lateral movement of the two cams 246 is controlled by a rotatable cam 281 affixed to the end of a driven shaft 282. The cam 281 is driven in rotation by a chain and sprocket 283 from the drive shaft 284 of the accelerator conveyor. This cam rotates a full revolution during every two full cycles of the accelerator chain. During one-half of one revolution of the cam 281, it causes the shaft 280 to be moved laterally to a position in which the cams 246 are located immediately above the accelerator drive dogs 228, 229. In this position of the cams 246 they cause the dogs to be cammed downwardly into engagement with the rear surface 272 of the front transport bars 163. In the other one-half revolution of the cam 281, the cam maintains the shaft 280 and the attached cams 246 out of vertical alignment with the accelerator conveyor drive dogs 228, 229 so that those dogs pass the cams 246 without being forced downwardly into engagement with the flight bars. Consequently, the accelerator conveyor drive dogs pick up and push a flight forwardly only during every other revolution of the accelerator conveyor.

Bucket Conveyor

The bucket conveyor 37 comprises an endless chain type conveyor having a pair of endless chains 300, 301 to which the buckets 36 are attached in side-by-side parallel relation. Each bucket is secured to the links of the chain 300, 301 independently of the adjacent buckets so that it may move over an arcuate path around the sprockets over which the chains are movable. Each bucket 36 comprises a bottom wall 303, a pair of angulated side walls 304, 305 and a slotted rear wall 306. The front side of each bucket is open but chips are precluded from falling out of the bucket by the retainer plate 255 fixedly secured to the side plates 136, 137 of the machine frame.

At one end of the conveyor, the chains 300, 301 are supported from a pair of lower idler sprockets 310 and a pair of upper idler sprockets 311. These sprockets 310, 311 are mounted upon idler shafts 312, 313 respectively. The shafts are in turn journalled within journal blocks 314, 315 secured to the side frame plate 136. At the opposite end of the conveyor, the chains 300, 301 are supported from a pair of upper drive sprockets 308 and a pair of idler sprockets 309. The drive sprockets 308 are non-rotatably keyed to a bucket conveyor drive shaft 317 operable to intermittently index or drive the bucket conveyor in such a fashion as to sequentially index the buckets into and out of the bucket conveyor unloading station 320 of the stack compression section of the machine. The drive shaft 317 is journalled within journal blocks 321 which are secured to frame brackets 322 of the stack compression conveyor frame 323. These brackets are fixedly secured to the frame 323 of the stack compression section 40 of the machine. Those same brackets 322 support upper journal blocks 324 within which an idler shaft 325 is rotatable. The idler shaft 325 supports the upper idler sprocket 309.

As the buckets move over the upper run of the bucket conveyor, the chains 300, 301 pass over guide bars 326. These guide bars 326 prevent the chains from sagging or drooping between the idler sprockets 311 and 309.

An intermittent drive operable to index seventeen buckets 36 of the bucket conveyor into and out of the unloading station 320 of the stack compression section of the machine is effected by the drive shaft 317 during the same time period that the accelerator cam drive dogs 228, 229 move a single flight and row of stack of chips into the buckets 36 of the bucket conveyor 37. Drive to the intermittently movable shaft 317 is effected from the main drive shaft 275 of the machine through a chain and sprocket drive 330 to an intermittent motion feed box 331. This box converts constant speed motion of the input shaft 332 into intermittent motion of the output shaft 317. Since the drive shaft 317 of the bucket conveyor is driven by the drive shaft of the machine, and since that same machine drive shaft is effective to drive the stack compression section of the machine, the stack compression section is always in synchronization with motion of the bucket conveyor.

Stack Compressor

The stack compression section of the machine is operable to accept the stacks of chips 130 from the bucket conveyor and move them in end-to-end sequential relation through a stack compressor track 335. In the course of passage along the track this section 40 of the machine compresses the stack of chips from an overall length of approximately 8 inches to an overall length of approximately 7¼ inches.

This compressor section of the machine comprises a frame 323 which includes a pair of side plates 337, 338. The track 335 comprises a generally U-shaped trough 336 open at the top and attached to transverse bars 339, 340 and 341 of the frame by supporting brackets 342, 243 and 344 respectively.

To effect movement of the stacks of potato chips 130 through the track 335 of the compressor section of the machine there are a pair of overhead conveyors 345, 348 supported between the side plates 337, 338. One 345 of these two conveyors is in the form of an endless chain 346 having pusher lugs 347 extending outwardly therefrom. The other 348 of the two conveyors is also a chain conveyor which comprises an endless chain 349 from which retainer lugs 350 extend outwardly. The retainer lugs move into a position in front of each stack of chips at the unloading station 320 of the bucket such that when the stack is subsequently pushed off of the bucket conveyor by one of the pusher lugs 347 of the other conveyor, the retainer lug of the conveyor 348 prevents the first chip in that stack from falling forwardly as the stack of chips is conveyed forwardly over the track 335. The rear pusher lug conveyor 347 moves at a faster rate of speed than the retainer lugs 350 of the slower moving conveyor 348. The difference in the rate of speed in the two conveyors is three-fourths inch over the length of the compressor section of the machine so that when the stack 130 reaches the discharge end of the stack compressor section of the machine it is three-fourths inch shorter in length or more tightly compressed or stacked than when it arrived at this section of the machine on the bucket conveyor.

The two conveyors 345 and 348 of the stack compressor section of the machine are both contained within the frame 323. Conveyor 345 is located to one side of center, i.e. closer to frame side plate 338 and the other conveyor 348 is located on the opposite side of center closer to the other side plate 337 of the machine frame 323. The pusher lugs 347 of the conveyor 345 extend inwardly from the chain 346 and then downwardly into the center plane of the trough 336. Similarly the lugs 350 of the other chain 349 extend inwardly from the chain and then downwardly into close proximity of the longitudinal center plane of the trough 336. Consequently, the lower portions of the lugs 347, 350 run in virtually a common plane, although the chains from which they are supported are located in different longitudinal planes.

The faster moving chain 346 is supported from three idler sprockets 353, 354 and 355 and a drive sprocket 352. All four of these sprockets are supported upon shafts 356, 357, 358 and 359 which are rotatably jornalled within the side plates 337, 338 of the stack compressor section of the machine.

The idler sprockets 360, 361 and the drive sprocket 362 of the slower moving retainer lug conveyor 348 are also supported upon shafts 363, 364 and 365. The shaft 365 is a drive shaft which is driven from a gear box 366.

This gear box 366 is driven from the main drive shaft 275 of the machine through a chain and sprocket drive 273 through a gear reducer 372 and input shaft 371. The output shaft 365 of the gear box 366 also drives a gear 367 which, through an idler gear 368 is operative to drive a gear 369 affixed to the drive shaft 356 of the faster moving chain conveyor 346. The ratio of the three gears 367, 368 and 369 determines the relative speed between the two chain conveyors 346, 349 of the compressor section 40 of the machine. Because the conveyors of the compressor section of the machine are driven from the main drive shaft 275 of the machine, both conveyors 346, 349 of the stack compressor section of the machine are always synchronized with the bucket conveyor which is driven from the same main drive shaft 275.

At the discharge end of the stack compressor section of the machine, lugs 380, 381 of the wrapper conveyor 382 pick up the leading and trailing edges of the compressed stack 130b and push it from the stack compression section of the machine. This conveyor 382 then conveys the stacks of chips through a track (not shown) of the conveyor 382 into a packer 41.

The packer 41 is a conventional commercially available machine such as a wrapper machine manufactured by Doboy Industries, Inc. of New Richmond, Wisconsin or a wrapper machine manufactured by Hayssen Manufacturing Co. of Sheboygan, Wisconsin. The latter of these two wrapper machines is the subject of and completely described in U.S. Pat. No. 3,274,746 which issued Sept. 27, 1966. It comprises a tube or mandrel through which the stacks of chips are conveyed while a continuous strip 385 of flexible impermeable wrapping material such as wax coated paper or polyethylene coated foil is wrapped about the hollow tube or mandrel. The tubular formed flexible wrapper 386 is then sealed along a longitudinal edge 387 as by heated rollers 390. As the strip emerges from the discharge end of the mandrel it is shaped as a tube having stacks of chips 130c spaced along its length. A transverse sealer and cutter of the wrapper machine then causes the tube to be compressed, sealed and cut between the spaced stacks 130c of chips such that the stacks of chips are contained within a sealed package 11. The sealed and separated packages 11 may then be packed within boxes or within other flexible wrappers to form marketable packages of one or more packs 11 contained within the box or wrapper.

Operation

The operation of the apparatus heretofore described will now be explained with particular reference to FIGS. 1, 2 and 17. This apparatus is operative to receive conventional dehydrated potato flakes, to mix those flakes with water, form the mix into a dough, convert the dough to potato dough chips, fry those chips and then to automatically assemble the chips into stacks and package the stacks of chips within flexible impermeable sealed wrappers so as to create packages of stacks of potato chips. The mixing of the potato chip flakes and water occurs within a mixer 14 into which the dough and water are fed in metered quantities from a hopper 12 and feeder 13. Potato chip dough discharged from the outlet of the mixer is distributed by a diverter 15 over the nip of a conventional three roll sheeter 17 by an oscillating arm 16 of the diverter. A thin sheet of rolled dough is discharged from the sheeter and falls upon a continuously moving cutting conveyor 18 operative to carry the sheet beneath a rotary cutter 19. This rotary cutter die cuts seventeen columns of potato dough chips from the sheet. Scrap dough emerging from the cutting operation is in the form of a continuous perforated sheet which is preferably returned to the mixer via a scrap return conveyor 21.

The dough chips are transported in columnar and row form from the die cutter over a belt conveyor 23 into the fryer 24. Within the fryer the chips are cooked or fried within a hot oil bath and the C-shape of the chips 20 is imparted as a consequence of the dough chips curling about contoured or molded surfaces of the fryer conveyor during the frying operation.

This C-shaped pototo chip product as it emerges from the fryer is best illustrated in FIG. 17a. After emerging from the deep fat fryer, the fried generally C-shaped chips 20 pass over the drain conveyor 26, beneath a seasoner 27, over a spreader conveyor 28 and an alignment conveyor 29. The drain conveyor comprises a screen mesh (FIG. 3) through which grease may freely drain to a catch basin (not shown). In the course of passage beneath the seasoner, salt or other conventional seasoning is distributed onto the top surfaces of the chips. The spreader conveyor 28 increases the lateral distance between adjacent chips while the aligner conveyor 29 causes the longitudinal distance between rows of chips to be increased preparatory to the chips entering the stacking section of the apparatus. This increased lateral spacing of the chips 20 upon the spreader conveyor 28 and increased longitudinal spacing between the rows of chips on the aligner conveyor 29 is best illustrated in FIG. 5.

From the alignment conveyor, the chips pass into the stacking section 5 of the machine. Within this section the longitudinal columns of chips are converted from individually spaced chips to a stack of face-to-face juxtapositioned chips of a measured number or quantity. Measurement of the number of chips within a stack is a function of the speed of the alignment conveyor 29 relative to the speed of the conveyors 133, 138 of the stacker section 31 of the machine. As the chips run off of the downstream end of the alignment conveyor 29 they fall into hockey stick like shaped chutes 30 (FIGS. 5 and 8). As the chips fall through the upstream end of the chutes at an approximate 60° angle to a horizontal plane, the chips are arranged in face-to-face juxtaposition. The first chip within which each stack 130 is supported within the chute 30 by the transport fingers 33 of the front transfer bar 158 of a transport flight 160 (the transport flights are best illustrated in FIG. 12). After a predetermined quantity of fired chips have fallen into the trough 30, the fingers 33a of the rear flight snap over into a position in engagement with the last chip in the stack and simultaneously the front fingers 33 of the next following flight snaps over into a position preparatory to receive the first chip of the next following stack 130. As each flight 160 passes the upstream generally sloping end of the troughs 30, it is operative to entrap a row of seventeen stacks of chips between the front transport fingers 33 and the rear transport fingers 33a of that flight. Throughout the passage of the chips through the hockey stick like shaped chutes 30, the chutes are vibrated by a vibrator 154 (FIG. 7) to facilitate and improve the nested relation of the chips within each stack.

In order to permit the last chip in a stack to move into the stack without its movement from the alignment conveyor 29 into the trough 30 being impeded by the fingers 33a of the trailing transport bar, those fingers 33a are rotated upwardly in a counterclockwise direction as viewed in FIG. 8 while the last chips of a stack continue to move from the alignment conveyor into the stack. After the last chips of a row are moved into a stack of chips, the fingers 33a snap downwardly simultaneously with forward snap-down movement of the leading fingers 33 of the next following flight 160 adjacent the entrance throat of the trough 30. This snap-down movement is imparted by actuation of a solenoid controlled pneumatic actutor motor 275 which moves a stop bar 262 and its connected stop elements 260, 261 to a position out of alignment with stops on the flight bars. Torsion springs 170, 170a of the flight bars then effect the snap-down movement of the bars and the connected fingers 33a, 33.

Each row of seventeen stacks of chips is then pushed through the seventeen troughs 30 of the stacker section of the machine by a transport flight 160. These flights are caused to move through the stacker section of the machine following a generally parallelogram shaped trackway 201 by drive dogs 208 of a constant speed chain conveyor 133. These drive dogs engage drive pins 169, 165 of the transfer flights and push the front transfer bar 158 of the flight through the trackways 201 until drive dogs 228, 229 (FIGS. 7, 9 and 12) of an intermittently movable acceleration conveyor 38 engage the rear surface of the front transfer bar 158 and push the forwardmost chip stack containing flight 160 at high speed toward and over the buckets 36 of a bucket conveyor 37. The bucket conveyor 37 is an intermittently movable conveyor which is timed so as to be stationary as the high speed acceleration conveyor 38 propels the first stack of chips 130a into the buckets. Thereafter the bucket conveyor indexes seventeen steps in the time period before the next flight 160 is picked up by the accelerator conveyor 138 and moved forwardly to locate that next following row of stacks of chips in the next seventeen buckets of the bucket conveyor 37. During each indexing step of the bucket conveyor one bucket is emptied at the unloading station 320 of the stack compression section of the machine. This latter section of the machine serially unloads the buckets and places the stacks onto a conveyor of the stack compression section of the machine where the stacks are arranged in spaced end-to-end relation.

Movement of the stacks 130 through the compression section of the machine is effected by two conveyors which move at differential speeds. In the course of passage of the stacks of chips 130 through this section of the machine (FIGS. 15 and 16) the length of each stack is changed from approximately 8 to 7¼ as a consequence of this linear speed differential. In the course of movement along the lower run of the chain conveyors 346, 348, the distance between the lugs of the two conveyors 346 and 348 between which the stacks are located during passage through this section is shortened by approximately ¾. Otherwise expressed, the lugs 350 of the slower moving front support conveyor 348 move at a slower speed than the lugs 347 of the pusher conveyor so that the total length of each stack of chips is shortened by approximately ¾ as the stacks move through this section.

From the compressor section of the machine the stacks of chips are pushed into a conventional tube type packer wherein a flat sheet of flexible impermeable wrapping material such as wax paper or polyethylene coated foil is wrapped about the stacks and sealed along its longitudinal edge 387 by hot rolls 390 or other conventional sealers. Subsequently, a hot cutoff knife and sealer 391 enters between the stacks 130 contained within the tube and compresses and seals that portion of the tube so as to form individual separated and sealed packs 11 of chip stacks.

The primary advantage of the invention described herein is that it enables stacks of chips to be manufactured and automatically packaged in stacks within flexible impermeable tube type wrappers. Prior to this invention and to my knowledge stacks of similarly shaped potato chips could only be automatically stacked and packaged within rigid tubular type containers wherein the stacking actually occurred within the rigid tube. This invention enables the stack to be formed outside the package and then to be subsequently packaged within a flexible impermeable wrapper with a consequent savings in packaging costs.

While I have described only a single preferred embodiment of my invention, persons skilled in the art to which it pertains will readily appreciate numerous changes and modifications which may be made without departing from the spirit of my invention. Therefore, I do not intend to be limited except by the scope of the following appended claims.

I claim:

1. Apparatus for use in combination with a system for manufacturing and packaging potato chips, which system is operative to mix a potato base dough, roll said dough into a flat sheet, cut said dough sheet into closely spaced columns of individual dough chips, and pass said closely spaced columns of dough chips through a chip fryer to convert said dough chips into columns of substantially identically shaped crisp potato chips, which apparatus comprises means for moving a predetermined quantity of each of said columns of crisp potato chips into a stack in which the potato chips of each stack are in face-to-face juxtaposition, and means for wrapping a flexible, impermeable wrapper around each of the stacks and for closing the edge and ends of the wrapper to form a completed wrapped and sealed package of a stack of potato chips.

2. The apparatus of claim 1 which further includes means for moving said rows of potato chips over diverging paths of movement prior to moving said rows into stacks.

3. Apparatus for use in combination with a system for manufacturing and packaging potato chips, which system is operative to mix a potato base dough, roll said dough into a flat sheet, cut said dough into closely spaced columns of individual dough chips, and pass said closely spaced columns of dough chips through a chip fryer to convert said dough chips into columns of substantially identically shaped crisp potato chips, which apparatus comprises a. means for moving a predetermined quantity of each of said columns of crisp potato chips into a stack in which the potato chips of each stack are in face-to-face juxtaposition, b. means for moving said stacks of potato chips over a conveyor while compressing the length of the stacks by restraining forward movement of the leading edge of the stack while forcing the trailing edge of the stacks toward the leading edge, and c. means for placing a flexible, impermeable wrapper around each of the stacks and closing the edge and ends of the wrapper to form a completed wrapped and sealed package of a stack of potato chips.

4. Apparatus for use in combination with a system for manufacturing and packaging potato chips, which system is operative to mix a potato base dough, roll said dough into a flat sheet, cut said dough into closely spaced columns of individual dough chips and pass said closely spaced columns of dough chips through a chip fryer to convert said dough chips into columns of crisp potato chips, which apparatus comprises a. means for moving a predetermined quantity of each of said columns of crisp potato chips into a chute in which the crisp potato chips drop by gravity into a stack of crisp potato chips in which the crisp potato chips are in face-to-face juxtaposition,
   b. means for moving said stacks of potato chips over a conveyor while compressing the length of the stacks by restraining forward movement of the leading edge of the stacks while forcing the trailing edge of the stacks toward the leading edge, and
   c. means for placing a flexible, impermeable wrapper around each of the stacks and for closing the edge and ends of the wrapper to form a completed wrapped package of a stack of potato chips.

5. Apparatus for use in combination with a system for manufacturing and packaging potato chips which system is operative to mix a potato base dough, roll said dough into a flat sheet, cut said dough into closely spaced parallel columns of individual dough chips, and pass said closely spaced parallel rows of dough chips through a chip fryer to convert said dough chips into parallel rows of substantially identically shaped crisp potato chips, which apparatus comprises a. means for moving a predetermined quantity of each of said parallel columns of crisp potato chips into one of a plurality of parallel stacks in which the potato chips of each stack are in face-to-face juxtaposition,
   b. means for reorienting said parallel stacks of potato chips so as to locate said stacks serially in spaced end-to-end alignment,
   c. means for wrapping a flexible, impermeable wrapper around each of the stacks and for closing the edge and ends of the wrapper to form a completed wrapped and sealed package of a stack of potato chips.

6. The apparatus of claim 5 which further includes means for moving said columns of potato chips over diverging paths of movement prior to moving said columns into stacks.

7. Apparatus for use in combination with a system for manufacturing and packaging potato chips, which system is operative to mix a potato base dough, roll said dough into a flat sheet, cut said dough into closely spaced columns of individual dough chips, and passing said closely spaced columns of dough chips through a chip fryer to convert said dough chips into columns of substantially identically shaped crisp potato chips, which apparatus comprises a. means for moving a predetermined quantity of each of said columns of crisp potato chips into a stack in which the potato chips of each stack are in face-to-face juxtaposition,
   b. means for moving said stacks of potato chips over a conveyor while compressing the length of the stacks by restraining forward movement of the leading edge of the stack while forcing the trailing edge of the stacks toward the leading edge, and
   c. means for placing each of said stacks within a sealed package.

8. Apparatus for use in combination with a system for manufacturing and packaging potato chips, which system is operative to mix a potato base dough, roll said dough into a flat sheet, cut said dough sheet into parallel columns of individual dough chips, and pass said parallel columns of dough chips through a chip fryer to convert said dough chips into parallel columns of substantially identically shaped crisp potato chips, which apparatus comprises stacking means for moving a predetermined quantity of each of said parallel columns of crisp potato chips into one of a plurality of parallel stacks in which the potato chips of each stack are in face-to-face juxtaposition, and wrapping means for wrapping a flexible, impermeable wrapper around each of the stacks and for closing the edge and ends of the wrapper to form a completed wrapped and sealed package of a stack of potato chips.

9. The apparatus of claim 8 which further includes continuously movable diverging conveyor means for moving said columns of potato chips over diverging paths of movement prior to moving said columns into said stacking means.

10. The apparatus of claim 8 in which said stacking means comprises transport flights and first and second conveyors for sequentially moving said transport flights through said stacking means, each of said transport flights being operable to convey at least one stack of chips through said stacking means.

11. The apparatus of claim 10 in which said first conveyor is a continuously movable conveyor.

12. The apparatus of claim 10 in which said second conveyor is an intermittently movable conveyor.

13. The apparatus of claim 10 in which said first conveyor is a relatively slow speed conveyor and said second conveyor is a much higher speed acceleration conveyor.

14. The apparatus of claim 13 in which said first conveyor is a constant speed conveyor and said second conveyor is an intermittently movable conveyor.

15. The apparatus of claim 8 wherein said stacking means comprises at least one conveyor for intermittently moving a plurality of parallel stacks of chips longitudinally through said stacking means, an intermittently movable second conveyor for simultaneously receiving said plurality of parallel stacks of chips and for transporting those parallel stacks of chips laterally in side-by-side parallel relation, and third conveyor means for receiving said parallel side-by-side arranged stacks of chips from said second conveyor and for transporting said plurality of stacks of chips serially in end-to-end colinear alignment to said wrapping means.

16. The apparatus of claim 15 in which said third conveyor means is operable to compress the length of said stacks of chips in the course of transporting said stacks of chips between said second conveyor and said wrapping means.

17. The apparatus of claim 16 in which said third conveyor means comprises at least one longitudinal trough and first and second endless chain conveyors, said first and second endless chain conveyors each having a plurality of lugs extending outwardly therefrom, said lugs being movable through said trough, the lugs of said first endless chain conveyor being operable to support the first chip of a stack of chips in the course of passage through said trough and the lugs of said second endless chain conveyor being oprable to push the last chip of a stack of chips through said trough, said lugs of said second chain conveyor being movable through said trough at a faster linear speed than the lugs of said first chain conveyor so that said stacks are compressed between said lugs in the course of passage through said trough.

18. The apparatus of claim 8 in which said stacking means includes a plurality of chutes into each of which the chips of one column drop by gravity to form a stack of crisp potato chips in which the chips are arranged in face-to-face juxtaposition.

19. The apparatus of claim 18 in which said chutes are vibrated as said chips drop into said chutes.

20. The apparatus of claim 18 in which at least a portion of each of said chutes slopes at an angle of approximately 60° to a horizontal plane.

21. The apparatus of claim 18 in which each of said chutes includes a sloping upstream end section and a generally horizontal downstream section, said sections being interconnected by a radiused section.

22. The apparatus of claim 21 in which said chutes are vibrated as said chips drop into said chutes.

23. The apparatus of claim 18 in which said stacking means comprises a plurality of transport flights, each of said transport flights comprising interconnected front and rear transport bar assemblies, each of said bar assemblies having a plurality of laterally spaced fingers extending outwardly therefrom, at least one of said fingers of each of said assemblies being movable within each of said chutes of said stacking means, said fingers of said front transport bar assembly being operable to support the first chip of each stack during passage through said chutes and the fingers of said rear transport bar assembly being operable to push the last chip of each stack through said chutes.

24. The apparatus of claim 23 in which said transport flights are movable within endless trackways of said stacking means.

25. The apparatus of claim 24 in which said fingers of each of said transport bar assemblies are rotatable about said bars, said fingers being spring biased to a position in which said fingers extend generally normal to the path of movement of said transport bars within said trackways.

26. The apparatus of claim 25 which further includes means for rotating said fingers rearwardly about said bar assemblies against said spring bias as the fingers approach the upstream chip entrance end of said chutes such that said fingers do not interfere with the entrance of the last chips of a stack into said chutes.

27. The apparatus of claim 26 in which said finger rotating means is operable to release said fingers for forward rotational movement back to a position in which the fingers are generally normal to the path of movement of said transport bars through said trackways after entrance of the last chip of a stack into said chutes.

28. Apparatus for packaging stacks of fragile food articles in face-to-face juxtaposition, which apparatus comprises means for arranging said articles on a horizontally moving conveyor in spaced parallel columns and rows, stacking means for moving a predetermined quantity of each of said parallel columns of articles into one of a row of parallel stacks in which the articles of each stack are in face-to-face juxtaposition, and conveyor means for rearranging said row of parallel stacks of articles into a single column of end-to-end colinearly aligned stacks of articles, and wrapping means for sequentially wrapping a flexible, impermeable wrapper around each of the stacks of said colinearly aligned stacks and for closing the edge and ends of the wrapper to form a completed wrapped and sealed package of a stack of food articles.

29. The apparatus of claim 28 which further includes continuously movable diverging conveyor means for moving said columns of articles over diverging paths of movement prior to moving said rows into said stacking means.

30. The apparatus of claim 28 in which said stacking means comprises transport flights and first and second conveyors for sequentially moving said transport flights through said stacking means, each of said transport flights being operable to convey at least one stack of food articles through said stacking means.

31. The apparatus of claim 30 in which said first conveyor is a continuously movable conveyor.

32. The apparatus of claim 30 in which said second conveyor is an intermittently movable conveyor.

33. The apparatus of claim 30 in which said first conveyor is a relatively slow speed conveyor and said second conveyor is a much higher speed acceleration conveyor.

34. The apparatus of claim 33 in which said first conveyor is a constant speed conveyor and said second conveyor is an intermittently movable conveyor.

35. The apparatus of claim 28 wherein said stacking means comprises at least one stacking conveyor for intermittently moving a plurality of parallel stacks of chips longitudinally through said stacking means, said conveyor means comprising a second conveyor and a third conveyor, said second conveyor being intermittently movable and operable to simultaneously receive a plurality of parallel stacks of chips and to transport those parallel stacks of chips laterally in side-by-side parallel relation, said third conveyor being operable to sequentially receive said parallel side-by-side arranged stacks of chips from said second conveyor and to transport said plurality of stacks of chips serially in end-to-end colinear alignment to said wrapping means.

36. The apparatus of claim 35 in which said third conveyor is operable to compress the length of said stacks of articles in the course of transporting said stacks of articles between said second conveyor and said wrapping means.

37. The apparatus of claim 36 in which said third conveyor comprises at least one longitudinal trough and first and second endless chain conveyors, said first and second endless chain conveyors each having a plurality of lugs extending outwardly therefrom, said lugs being movable through said trough, the lugs of said first endless chain conveyor being operable to support the first articles of a stack of articles in the course of passage through said trough and the lugs of said second endless chain conveyor being operable to push the last articles of a stack of articles through said trough, said lugs of said second chain conveyor being movable through said trough at a faster linear speed than the lugs of said first chain conveyor so that said stacks are compressed between said lugs in the course of passage through said trough.

38. The apparatus of claim 28 in which said stacking means includes a plurality of chutes into each of which the articles of one column drop by gravity to form a stack of articles in which the articles are arranged in face-to-face juxtaposition.

39. The apparatus of claim 38 in which said chutes are vibrated as said articles drop into said chutes.

40. The apparatus of claim 38 in which at least a portion of each of said chutes slopes at an angle of approximately 60° to a horizontal plane.

41. The apparatus of claim 38 in which each of said chutes includes a sloping upstream end section and a generally horizontal downstream section, said sections being interconnected by a radiused section.

42. The apparatus of claim 41 in which said chutes are vibrated as said articles drop into said chutes.

43. The apparatus of claim 38 in which said stacking means comprises a plurality of transport flights, each of said transport flights comprising interconnected front and rear transport bar assemblies, each of said bar assemblies having a plurality of laterally spaced fingers extending outwardly therefrom, at least one of said fingers of each of said assemblies being movable within each of said chutes of said stacking means, said fingers of said front transport bar assembly being operable to support the first article of each stack during passage through said chutes and the fingers of said rear transport bar assembly being operable to push the last article of each stack through said chutes.

44. The apparatus of claim 43 in which said transport flights are movable within endless trackways of said stacking means.

45. The apparatus of claim 44 in which said fingers of each of said transport bar assemblies are rotatable about said bars, said fingers being spring biased to a position in which said fingers extend generally normal to the path of movement of said transport bars within said trackways.

46. The apparatus of claim 45 which further includes means for rotating said fingers rearwardly about said bar assemblies against said spring bias as the fingers approach the upstream article entrance end of said chutes such that said fingers do not interfere with the entrance of the last articles of a stack into said chutes.

47. The apparatus of claim 46 in which said finger rotating means is operable to release said fingers for forward rotational movement back to a position in which the fingers are generally normal to the path of movement of said transport bars through said trackways after entrance of the last article of a stack into said chutes.

* * * * *

UNITED STATES PATENT AND TRADEMARK OFFICE
CERTIFICATE OF CORRECTION

PATENT NO. : 3,988,875
DATED : Nov. 2, 1976
INVENTOR(S) : Rudolph J. Fay

It is certified that error appears in the above-identified patent and that said Letters Patent are hereby corrected as shown below:

```
Col.  1, line 16, "path" should be --bath--
Col.  1, line 64, "shaped" should be --shape--
Col.  2, line 29, "is" should be --if--
Col.  2, line 50, "or" should be --of--
Col.  3, line 56  "conveting" should be --converting--
Col.  4, line 21, "deposted" should be --deposited--
Col.  6, line 22, "agains" should be --against--
Col.  9, line 23, "or" should be --of--
Col. 13, line 44, "can" should be --cam--
Col. 13, line 55, "brackets" should be --buckets--
Col. 20, line 52, "fired" should be --fried--
Col. 21, line 54, after "8" insert --"--
Col. 21, line 54, after "7 1/4" insert --"--
Col. 21, line 60, after "3/4" insert --"--
Col. 21, line 64, after "3/4" insert --"--
```

Signed and Sealed this

Twenty-second Day of March 1977

[SEAL]

Attest:

RUTH C. MASON
*Attesting Officer*

C. MARSHALL DANN
*Commissioner of Patents and Trademarks*